United States Patent
Miyanaga et al.

(10) Patent No.: US 8,100,768 B2
(45) Date of Patent: Jan. 24, 2012

(54) STORAGE MEDIUM STORING GAME PROGRAM AND GAME APPARATUS

(75) Inventors: Makoto Miyanaga, Kyoto (JP); Keisuke Nishimori, Kyoto (JP); Kazuaki Morita, Kyoto (JP); Kenji Matsutani, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 632 days.

(21) Appl. No.: 11/707,947

(22) Filed: Feb. 20, 2007

(65) Prior Publication Data
US 2008/0113798 A1 May 15, 2008

(30) Foreign Application Priority Data
Nov. 15, 2006 (JP) .................................. 2006-308593

(51) Int. Cl.
*A63F 13/00* (2006.01)
(52) U.S. Cl. ................. 463/37; 463/32; 463/36; 463/40
(58) Field of Classification Search .................... 463/36, 463/37, 40, 32
See application file for complete search history.

(56) References Cited

U.S. PATENT DOCUMENTS

| | | | |
|---|---|---|---|
| 6,921,332 B2 * | 7/2005 | Fukunaga et al. | 463/8 |
| 2002/0103025 A1 * | 8/2002 | Murzanski et al. | 463/37 |
| 2003/0030619 A1 * | 2/2003 | Martin et al. | 345/156 |
| 2003/0199317 A1 * | 10/2003 | McCauley | 463/37 |
| 2006/0128468 A1 * | 6/2006 | Yoshikawa et al. | 463/36 |
| 2006/0166738 A1 * | 7/2006 | Eyestone et al. | 463/36 |
| 2006/0247046 A1 * | 11/2006 | Choi et al. | 463/36 |

FOREIGN PATENT DOCUMENTS

| | | |
|---|---|---|
| JP | 2002-153673 | 5/2002 |
| JP | 2002-200339 | 7/2002 |

* cited by examiner

*Primary Examiner* — Dmitry Suhol
*Assistant Examiner* — Brandon Gray
(74) *Attorney, Agent, or Firm* — Nixon & Vanderhye P.C.

(57) ABSTRACT

A game apparatus includes a plurality of controllers. Each of the controllers is provided with an acceleration sensor, for example, for detecting a motion thereof. A magnitude of a motion value detected by each of the controllers is determined, and a motion with a maximum value is determined to be effective, and a game processing is executed.

9 Claims, 13 Drawing Sheets

FIG. 3
(A)
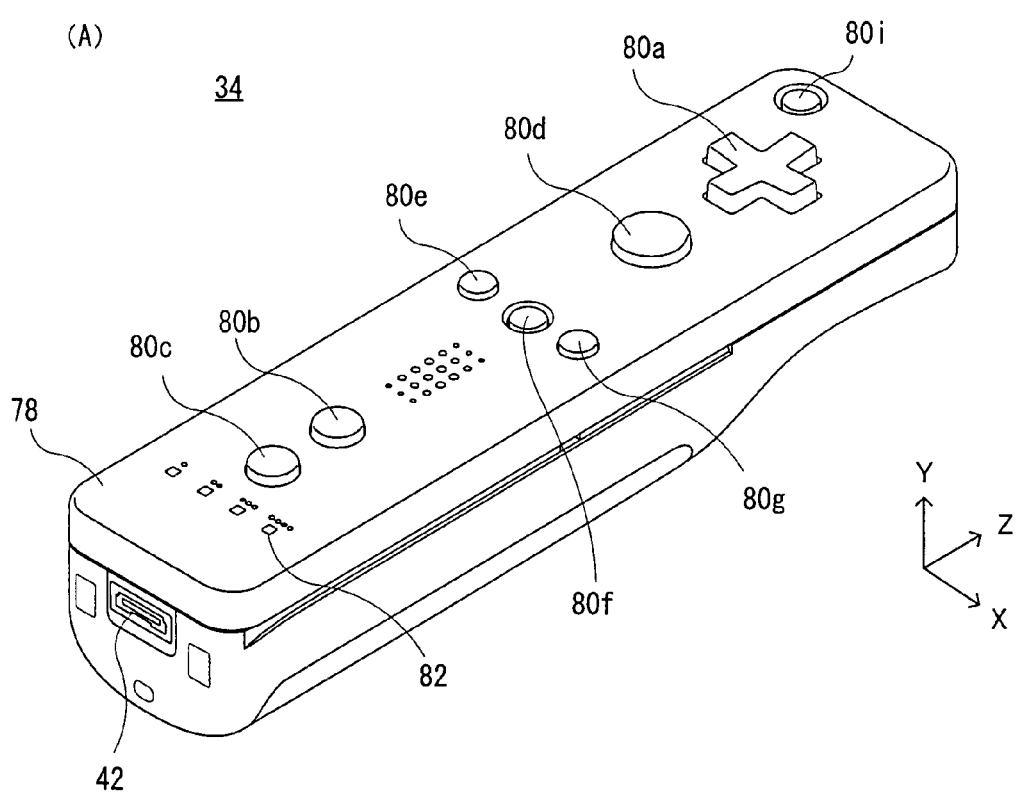
(B)
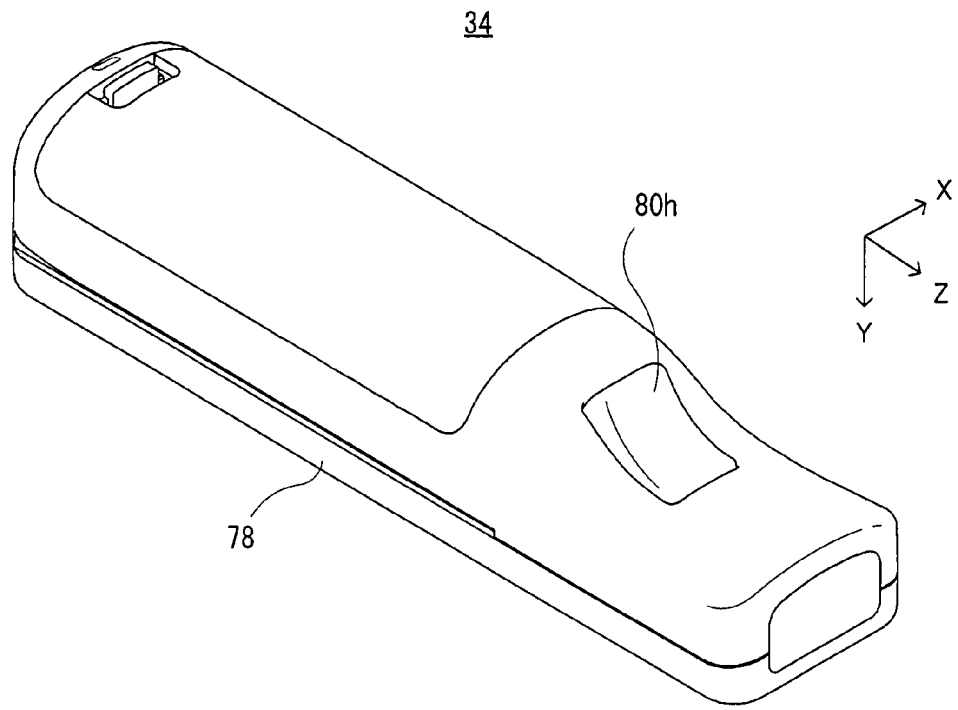

FIG. 4
(A)
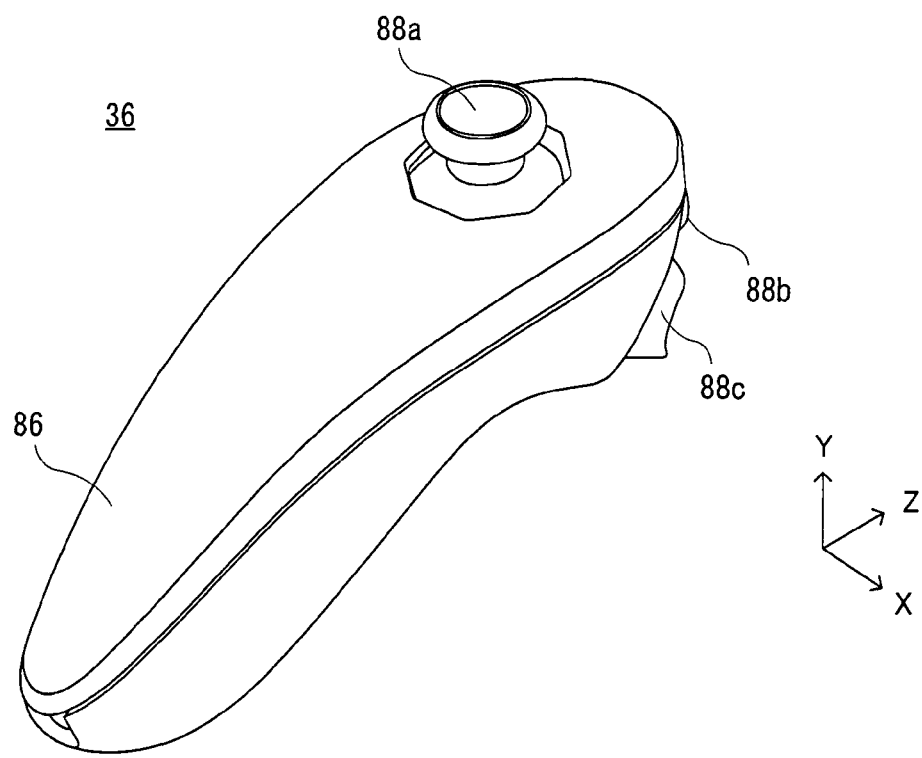
(B)
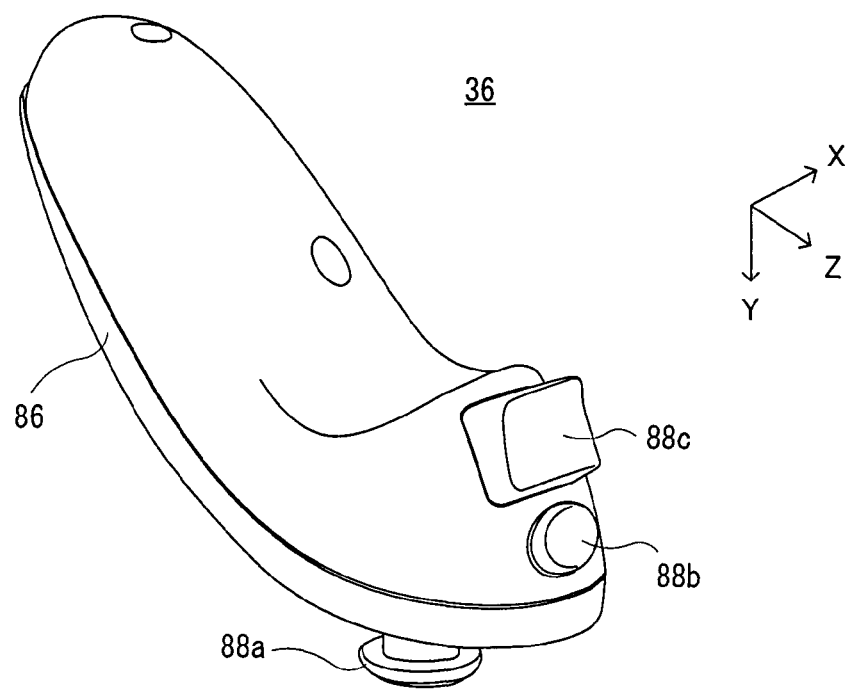

STORAGE MEDIUM STORING GAME PROGRAM AND GAME APPARATUS

CROSS REFERENCE TO RELATED APPLICATION

The disclosure of Japanese Patent Application No. 2006-308593 is incorporated herein by reference.

BACKGROUND AND SUMMARY

The exemplary embodiments disclosed herein relate to a storage medium storing a game program and a game apparatus, and particularly relate to the storage medium storing a game program and the game apparatus for detecting motion of a plurality of operation devices.

A game of acquiring and using a motion of an operation device is known. For example, a game apparatus played by a player with gloves (operation devices) on right and left hands is disclosed in the document 1 (Japanese Patent Laying-Open No. 2002-153673) and the document 2 (Japanese Patent Laying-Open No. 2002-200339).

In a technique described in the document 1, an acceleration sensor is provided respectively in right and left pair of glove units as a controller, whereby an acceleration of three axes in front and rear (Y), right and left (X), and upper and lower directions of each of the gloves is detected, and the kind of punch is identified by an analysis of an output waveform of this acceleration sensor. Specifically, time interval from the start of hitting to the end of hitting of punch is detected from a waveform of the Y-axial acceleration, and the kind of punch (straight, hook, or upper punch) is determined from the waveform of the X-axial acceleration and the Z-axial acceleration of this time interval, and a game processing in accordance with the kind of punch is performed. At this time, depending on the punch from either a right or left fist, a performance display of an opponent character being staggered in an opposite direction is performed.

In a technique disclosed in the document 2, in the same way as the document 1, a three-axes acceleration sensor is provided respectively in the right and left pair of glove type cases as the controller, and the kind of punch is determined from the acceleration in each direction of the X, Y, and Z-axes. Specifically, when satisfying X>Y and X>Z, the kind of punch is determined to be the straight punch, when satisfying Z>X and Z>Y, the kind of punch is determined to be the upper punch, and when satisfying X>Z and Y>Z, the kind of punch is determined to be the hook punch, thus performing the game processing in accordance with the kind of punch.

However, the game apparatus disclosed in the aforementioned documents is not designed to judge amounts of the motion of the right and left gloves (operation devices) to reflect on a game the motion of the glove making larger motion. Namely, in the game apparatus disclosed in the aforementioned document 1, the performance display of the game is differentiated according to the punch from either the right or left fist. However, a problem involved therein is that when the acceleration is detected from both gloves, both accelerations are made to be effective and reflected on the game, because the processing is not adapted to make either one of the right and left punches effective. Also in the game apparatus disclosed in the aforementioned document 2, the game is progressed based on an acceleration signal corresponding to the motion of the both hands, thus involving the same problem as that of the aforementioned document 1.

Therefore, a feature of certain exemplary embodiments is to provide a novel storage medium storing a game program and game apparatus.

Another feature of certain exemplary embodiments is to provide a storage medium storing a game program and a game apparatus capable of performing a new operation by using a plurality of operation devices for detecting motion.

Still another feature of certain exemplary embodiments is to provide a storage medium storing a game program and a game apparatus capable of reflecting on a game a motion of an operation device making the maximum motion, out of a plurality of simultaneously moved operation devices.

The certain exemplary embodiments described herein have the following features to solve the above-described problems. It should be noted that reference numerals and footnote, etc. which are enclosed in parentheses show only one example of correspondences with the exemplary embodiment described later in order to help the understandings of these certain exemplary embodiments and are not intended to be limiting in any way.

A first exemplary embodiment provides a storage medium storing a game program executed in a computer of a game apparatus including a plurality of operation devices each having a motion detecting means for detecting a motion. The game program makes the computer execute a motion value acquiring step, a motion value determining step, and a motion processing step. The motion value acquiring step acquires a motion value detected by each motion detecting means. The motion value determining step determines a magnitude of each motion value acquired by the motion value acquiring step. The motion processing step processes the motion value as effective, that is determined to be maximum by the motion value determining step.

According to the first exemplary embodiment, the game program is executed in a computer (44) of a game apparatus (12) including a plurality of operation devices (14, 34, 36). Each operation device has motion detecting means (84, 90) for detecting its motion, and the motion value detected by each motion detecting means is acquired by the motion value acquiring step (S21, S27, S51, S57). Discrimination of the magnitude of the motion value thus acquired is performed by the motion value determining step (S29, S31, S61, S63, S85, S93, S101, S109). In the motion processing step (S133, S137, S141, S145), a maximum motion value is made to be effective and processed.

According to the first exemplary embodiment, even when the motion is simultaneously detected in the plurality of operation devices, priority is given to a maximum motion, and only this motion can be reflected on a game. In addition, a new operation can be performed, such as moving the plurality of operation devices and making only the operation of maximum motion effective.

A second exemplary embodiment provides a storage medium storing a game program according to the first exemplary embodiment. The motion value acquiring step acquires a motion value detected per unit time by each motion detecting means. The motion value determining step includes a variation calculating step of respectively calculating a variation per unit time of each motion value acquired by the motion value acquiring step, and determines a magnitude of each variation calculated by the variation calculating step as the each motion value.

According to the second exemplary embodiment, when the motion value is determined, the variation of each motion value per unit time is calculated by the variation calculating step (S27, S57), and the magnitude of each variation is determined. Since the magnitude of the variation per unit time is compared, a detection accuracy of the motion can be improved.

A third exemplary embodiment provides a storage medium storing a game program according to the first or second exemplary embodiments. The motion detecting means detects each of the motions in a plurality of directions. The motion value acquiring step acquires the motion value in the each direction. The motion value determining step includes a direction specifying step of determining the magnitude of the motion value in each direction for each operation device and specifying a direction corresponding to a maximum motion value as a moving direction of the operation device, and determines the magnitude of the motion value of each operation device corresponding to the direction of each operation device specified by the direction specifying step.

According to the third exemplary embodiment, each motion value in a plurality of directions in each operation device is acquired. When the motion value is determined, the direction corresponding to the maximum motion value obtained by determining the magnitude of the motion value in each direction of each operation device is specified as the moving direction of each operation device by the direction specifying step (S33, S35, S65, S67). By determining the magnitude of the motion value corresponding to the moving direction of each operation device thus specified, the motion value can be determined in a direction of an operation of maximum motion, and the motion in this direction is made to be effective and can be processed.

A fourth exemplary embodiment provides a storage medium storing a game program according to any one of the first to third exemplary embodiments. The motion value determining step includes a correcting step of correcting at least one of the respective motion values acquired by the motion value acquiring step, and determines the magnitude of the respective motion values including a motion value corrected by the correcting step.

According to the fourth exemplary embodiment, the magnitude of the motion value can be changed from the detected value by correction by the correcting step (S59). Then, the magnitude of each motion value including the corrected motion value is determined. For example, by correcting the motion value of a specified operation device and the motion value in a specified direction, the operation of the specified operation device and the operation in the specified direction can be easily made to be effective or made hard to be effective. Particularly, when playing with a plurality of players, it is possible to provide a way of playing a game designed to give odds to a player of the specified operation device.

A fifth exemplary embodiment provides a storage medium storing a game program according to any one of the first to forth exemplary embodiments. The plurality of operation devices include a first operation device for being operated by a right hand of a player, and a second operation device for being operated by a left hand of the player.

According to the fifth exemplary embodiment, the player can operate the game, with the first operation device with the right hand, and the second operation device with the left hand, respectively. Since only the operation showing the maximum motion value is made to be effective, even if both hands are moved simultaneously, the game is performed in accordance with the operation by one hand, thus making it possible to prevent an unnatural operation in a game that is unnatural if operated simultaneously by both hands.

A sixth exemplary embodiment provides a storage medium storing a game program according to any one of the first to fifth exemplary embodiments. The motion detecting means is an acceleration sensor.

According to the sixth exemplary embodiment, the motion of each operation device can be detected by acceleration. The operation showing a maximum acceleration value and a maximum acceleration variation is made to be effective to thereby execute the game.

A seventh exemplary embodiment provides a game apparatus including a plurality of operation devices each having a motion detecting means for detecting a motion. This game apparatus has a motion value acquiring means, a motion value determining means, and a motion processing means. The motion value acquiring means acquires the motion value detected by each motion detecting means. The motion value determining means determines a magnitude of each motion value acquired by the motion value acquiring means. The motion processing means processes the motion value as effective that is determined to be maximum by the motion value determining means.

According to the seventh exemplary embodiment, effects similar to those of the storage medium storing a game program of the aforementioned first exemplary embodiment can be exhibited.

According to the certain exemplary embodiments described herein, the maximum motion out of the motions of a plurality of operation devices is made to be effective and reflected on the game. In addition, a new operation can be performed by simultaneously moving a plurality of operation devices, and making only the operation with maximum motion value effective.

The above described features, aspects and advantages of the certain exemplary embodiments described herein will become more apparent from the following detailed description when taken in conjunction with the accompanying drawings.

BRIEF DESCRIPTION OF THE DRAWINGS

FIG. 3 is an illustrative view showing an example of the external appearance of a first controller, FIG. 3(A) is a perspective view viewed from the upper side of the rear, and FIG. 3(B) is a perspective view viewed from the lower side of the front;

FIG. 4 is a perspective view showing an example of an external appearance of a second controller, FIG. 4(A) is a perspective view viewed from the upper side of the rear, and FIG. 4(B) is a perspective view viewed from the lower side of the front;

DETAILED DESCRIPTION

Figure 1:
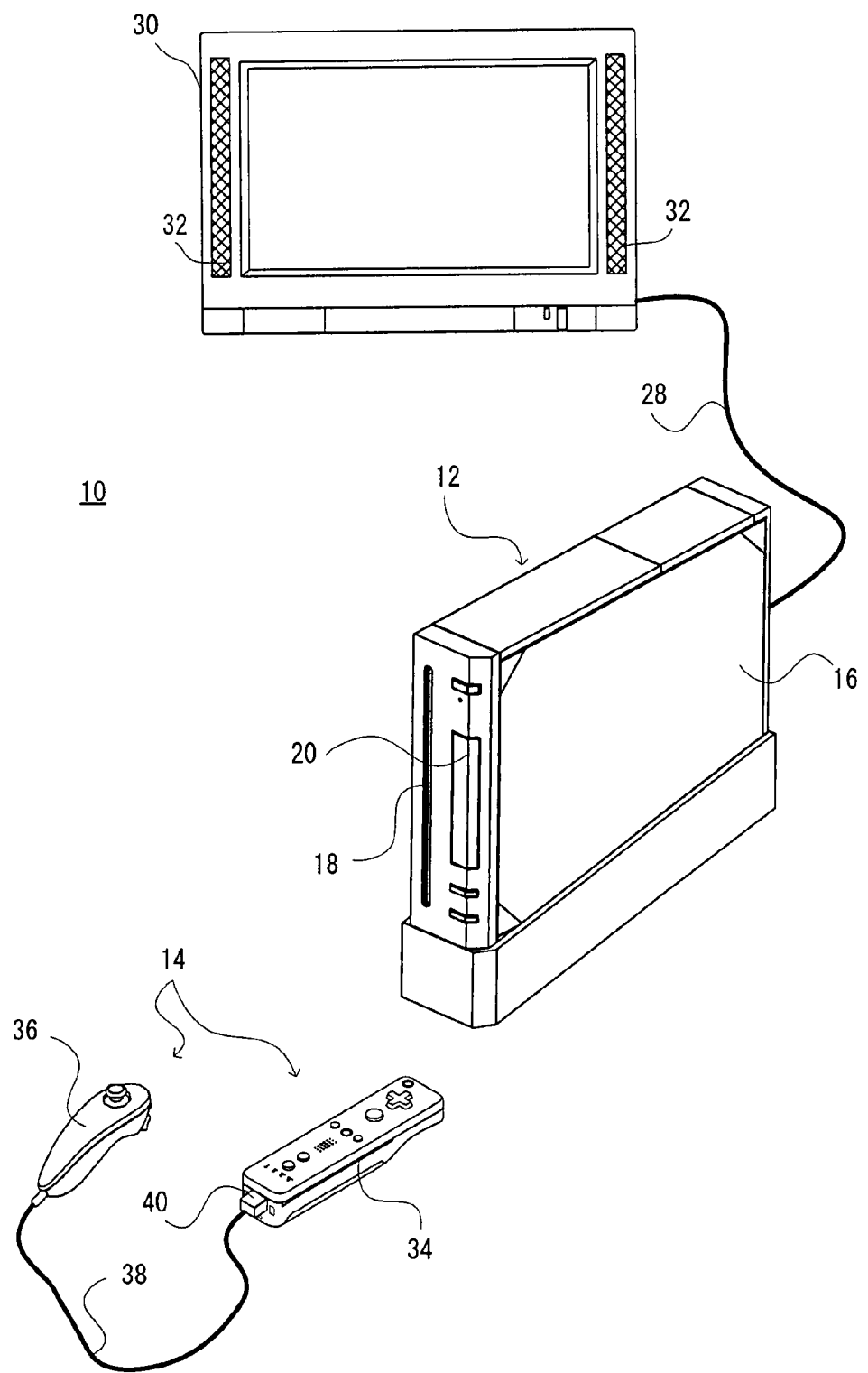
FIG. 1 is an external appearance view showing an outline of a game system according to an exemplary embodiment.

Referring to FIG. 1, a game system 10 in accordance with one exemplary embodiment includes a game apparatus 12 and a controller 14. The game apparatus 12 is a game console. The controller 14 is an input device or an operation device for a user or a player. The game apparatus 12 and the controller 14 are connected with each other by radio.

The game apparatus 12 includes a roughly rectangular parallelepiped housing 16, and the housing 16 is furnished with a disk slot 18 and a memory card slot cover 20 on a front surface. An optical disk 22 (FIG. 2) as one example of an information storage medium storing game program and data is inserted from the disk slot 18 to be loaded into a disk drive 24 (FIG. 2) within the housing 16. Inside the memory card slot cover 20 is provided a memory card slot through which an external memory card 26 (FIG. 2) is inserted. The memory card 26 is employed for loading the game program, etc. read from the optical disk 22 (FIG. 2) to temporarily store it, storing (saving) game data (result data or proceeding data) of the game played by means of the game system 10, and so forth. It should be noted that storing the game data described above may be performed on an internal memory such as a flash memory, etc in place of the external memory card 26.

The game apparatus 12 has an AV cable connector (not illustrated) on a rear surface of the housing 16, and by means of the connector, the game apparatus 12 is connected to a monitor (display) 30 via an AV cable 28. The monitor 30 is typically a color television receiver, and through the AV cable 28, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 30, and a stereo game sound, such as a game music, a sound effect, etc. is output from integrated speakers 32. The power of the game apparatus 12 is applied by means of a general AC adapter (not illustrated). The AC adapter is inserted into a standard wall socket for home use, and transforms the house current to a low DC voltage signal suitable for driving the game apparatus 12. In another exemplary embodiment, a battery may be utilized as a power supply.

The controller 14, which is described in detail later, includes a first controller 34 and a second controller 36 each capable of being held with one hand. A cable 38 has one end extending from the rear end of the second controller 36 and the other end provided with a connector 40. The connector 40 is connected to a connector 42 (FIG. 3, FIG. 5) provided on a rear end surface of the first controller 34. Operation data or input data of the second controller 36 is applied to the first controller 34 through the cable 38. The first controller 34 transmits controller data including the input data of the first controller 34 itself and the input data of the second controller 36.

In the game system 10, a user turns the power of the game apparatus 12 on for playing the game (or other applications), then selects an appropriate optical disk 22 storing a video game (or other applications the player wants to play), and loads the optical disk 22 into the disk drive 24 through the disk slot 18 of the game apparatus 12. In response thereto, the game apparatus 12 starts to execute a video game or other applications on the basis of the software stored in the optical disk 22. The user operates the controller 14 in order to apply an input to the game apparatus 12.

Figure 2:
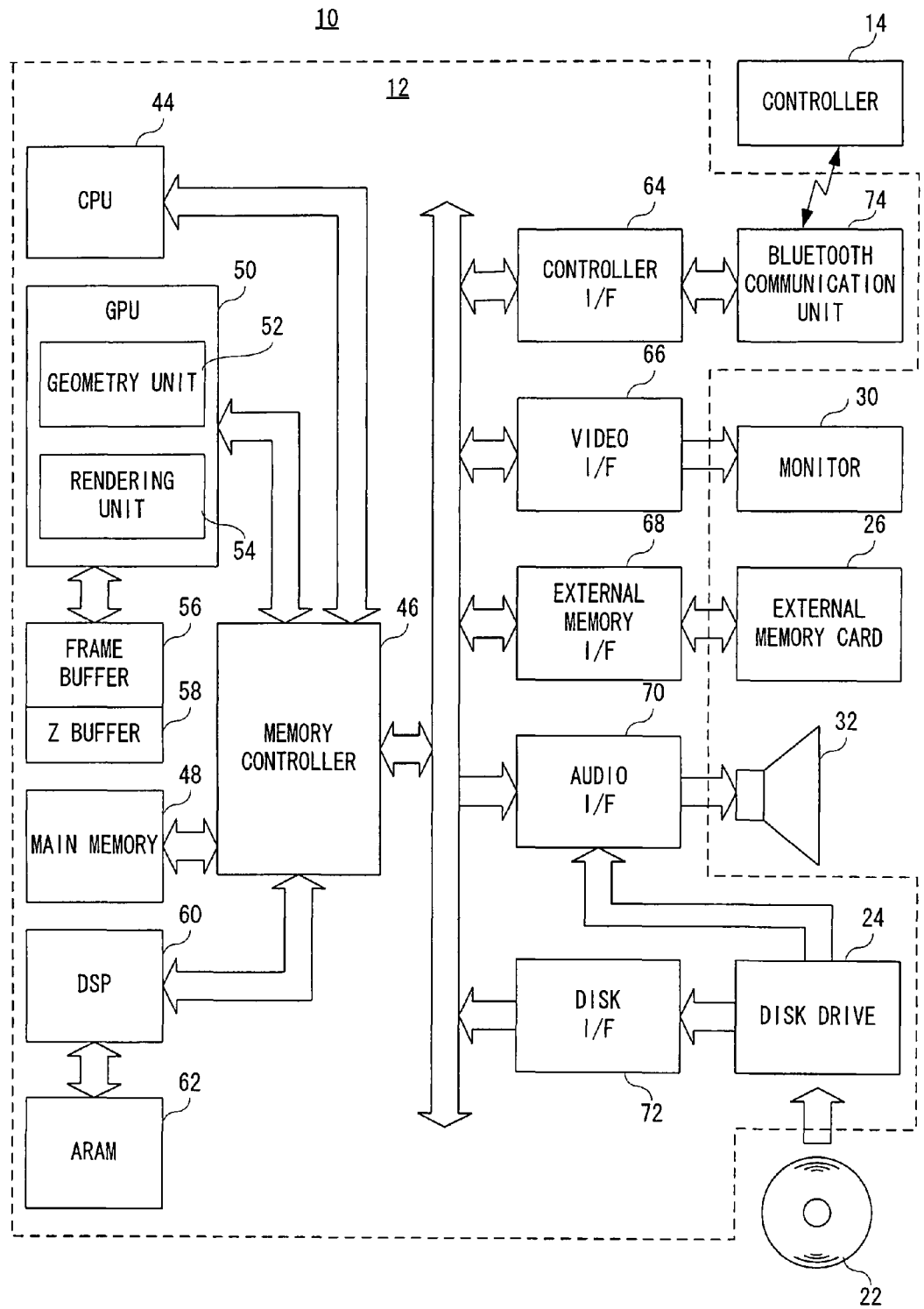
FIG. 2 is a block diagram showing an example of an electrical construction of the game system.

FIG. 2 is a block diagram showing an electric configuration of the game system 10. The game apparatus 12 includes a CPU 44. The CPU 44 functions as a game processor, and is in charge of an overall control of the game apparatus 12. The CPU 44 is connected with a memory controller 46 via a bus. The memory controller 46 mainly controls writing and reading of a main memory 48 connected via a bus under the control of the CPU 44. The memory controller 46 is connected with a GPU (Graphics Processing Unit) 50.

The GPU 50 forms a part of a rendering means, and is constituted by a single chip ASIC, for example, receives a graphics command (rendering command) from the CPU 44 via the memory controller 46, and by following the command thus received, generates a 3D game image by a geometry unit 52 and a rendering unit 54. Namely, the geometry unit 52 performs coordinate arithmetic processing of rotation, movement, and deformation, etc. of various objects in a three dimensional coordinate system. The object is formed of a plurality of polygons (the polygon here refers to a polygonal plane defined by at least three vertexes coordinates). The rendering unit 54 performs image generation processing such as attaching a texture (texture image) to each polygon of various objects, and so forth. Accordingly, 3D image data to be displayed on the game screen is generated by the GPU 50, and the image data is stored in a frame buffer 56.

Note that necessary data (primitive or polygon and texture, etc) required to execute the graphics command by the GPU 50 is obtained from the main memory 48 via the memory controller 46 by the GPU 50.

The frame buffer 56 is a memory for drawing (accumulating) one frame of image data of a raster scan monitor 30, for example, and is overwritten for every frame by the GPU 50. Specifically, the frame buffer 56 sequentially stores chromatic information of an image for each pixel. Here, the chromatic information refers to data on R, G, B and A, and corresponds to R (red) data of 8 bits, G (green) data of 8 bits, B (blue) data of 8 bits, and A (alpha) data of 8 bits, for example. Note that A data is the data on a mask (mat image). Additionally, a video I/F 66 to be described later reads the data in the frame buffer 56 via the memory controller 46 to thereby display a game image on the monitor 30.

In addition, a Z buffer 58 has a storage capacity (the number of pixels corresponding to the frame buffer 56× the number of bits of the depth data per one pixel), and stores depth information or depth data (Z value) of dots corresponding to each storage location of the frame buffer 56.

Both of the frame buffer 56 and the Z buffer 58 may be constituted by using one portion of the main memory 48, and also these buffers may be provided inside the GPU 50.

The memory controller 46 is furthermore connected to a RAM for audio (referred to as "ARAM" hereafter) 62 via a DSP (Digital Signal Processor) 60. Accordingly, the memory controller 46 controls writing and/or reading of the ARAM 62 as a sub-memory as well as that of the main memory 48.

The DSP 60 works as a sound processor, and generates audio data corresponding to sound, voice or music necessary for the game, by using sound data stored in the main memory 48 and by using sound wave (tone) data written in the ARAM 62 and so on.

The memory controller 46 is further connected to respective interfaces (I/F) 64, 66, 68, 70, and 72 by the bus. The controller I/F 64 is an interface for the controller 14 connected to the game apparatus 12 via a Bluetooth communication unit 74. More specifically, the Bluetooth communication unit 74 is a communication device for the main body, and receives controller data (input data) sent from a radio module 76 (FIG. 5), that is, a communication device of the controller 14. The controller I/F 64 applies the controller data received through the Bluetooth communication unit 74 to the CPU 44 through the memory controller 46. The video I/F 66 accesses the frame buffer 56 to read the image data generated by the GPU 50, and applies the image signal or the image data (digital RGBA pixel value) to the monitor 30 via the AV cable 28 (FIG. 1).

The external memory I/F 68 associates the external memory card 26 to be inserted into the front surface of the game apparatus 12 with the memory controller 46. Whereby, the CPU 44 can write the data into the memory card 26, or can read out the data from the memory card 26, via the memory controller 46. The audio I/F 70 receives audio data given from the DSP 60 through the memory controller 46, or an audio stream read from the optical disk 22, and gives audio signals (sound signal) corresponding thereto to the speakers 32 of the monitor 30.

The disk I/F 72 connects the disk drive 24 to the memory controller 46 to thereby allow the CPU 44 to control the disk drive 24. The program and data read out from the optical disk 22 by this disk drive 24 are written into the main memory 48 under the control of the CPU 44. The CPU 44 executes a process for the game or the application according to this program.

FIG. 3 shows one example of an external appearance of the first controller 34. FIG. 3 (A) is a perspective view viewing the first controller 34 from above rear, and FIG. 3 (B) is a perspective view viewing the first controller 34 from below front.

The first controller 34 has a housing 78 formed by plastic molding, for example. The housing 78 is formed into an approximately rectangular parallelepiped shape regarding a back and forth direction (Z-axis direction shown in FIG. 3) as a longitudinal direction, and has a size small enough to be held by one hand of a child and an adult. As one example, the housing 78 has a length or a width approximately the same as that of the palm of the person. A player can perform a game operation by means of the first controller 34, that is, by pushing buttons provided on it and by changing a position and a direction of the first controller 34 itself.

The housing 78 is provided with a plurality of operation buttons. That is, on the top surface of the housing 78, a cross key 80a, an X button 80b, a Y button 80c, an A button 80d, a select switch 80e, a menu switch 80f, and a start switch 80g are provided. Meanwhile, on the bottom surface of the housing 78, a concave portion is formed, and on the reward inclined surface of the concave portion, a B button 80h is provided. Each of the buttons (switches) 80a-80h is assigned an appropriate function according to a game program to be executed by the game apparatus 12. Furthermore, the housing 78 has a power switch 80i for turning on/off the power of the main body of the game apparatus 12 on a top surface from a remote place. The respective buttons (switches) provided on the first controller 34 may inclusively be indicated with the use of the reference numeral 80.

At the back surface of the housing 78, the above-described connector 42 is provided. The connector 42 is a 32 pin edge connector, for example, and utilized for connecting other devices to the first controller 34. In this exemplary embodiment, the connector 42 is connected with the connector 40 of the second controller 36. At the back end of the top surface of the housing 78, a plurality of LEDs 82 is provided, and the plurality of LEDs 82 shows a controller number (identification number of the controller) of the controller 14. The game apparatus 12 can be connected with a maximum four controllers 14, for example. If a plurality of controllers 14 is connected to the game apparatus 12, a controller number is applied to the respective controllers 14 in the order connected, for example. Each LED 82 corresponds to a controller number, and the LED 82 corresponding to the controller number lights up.

Furthermore, inside the housing 78 of the first controller 34, an acceleration sensor 84 (FIG. 5) is provided. As an acceleration sensor 84, acceleration sensors of an electrostatic capacity type can typically be utilized. The acceleration sensor 84 detects accelerations of a linear component for each sensing axis and gravitational acceleration out of the accelerations applied to a detection portion of the acceleration sensor. The acceleration sensor 84 detects accelerations of at least two axes which are orthogonal with each other. For the two-axis or three-axis acceleration sensor, for example, the acceleration applied to the detection portion of the acceleration sensor is detected as accelerations of linear components along the respective axes. More specifically, in this exemplary embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34. The acceleration detected for each axis of the acceleration sensor 84 is subjected to a predetermined arithmetic process, to thereby calculate a slope and a rotation of the first controller 34. For example, gravitational acceleration is constantly applied even in a state that the acceleration sensor 84 stands still, and acceleration corresponding to a slope of each axis with respect to the gravitational acceleration is detected for each axis. More specifically, when the acceleration sensor 84 stands still in a horizontal state (that is, X and Z-axis directions are a horizontal direction, and a Y-axis direction is a vertical direction), the gravitational acceleration of 1G is applied to the Y-axis of the acceleration sensor 84, and the gravitational accelerations to the other X and Z-axes are 0. When the acceleration sensor 84 is sloped from the horizontal state, the gravitational acceleration is distributed into each axis of the acceleration sensor 84 depending on angles formed by each axis direction of the acceleration sensor 84 and the gravitational direction, and at this time, an acceleration value of each axis of the acceleration sensor 84 is detected. An arithmetic operation is performed on the acceleration value for each axis, to thereby calculate the orientation of the acceleration sensor 84 with respect to the direction of the gravitational acceleration.

It should be noted that as an acceleration sensor 84, two-axis acceleration sensors may be utilized for detecting any two of the directions of the accelerations out of the up and down direction, the right and left direction and the back and forth direction according to the shape of the housing 78, the limitation on how to hold the first controller 34, or the like. One-axis acceleration sensors may be utilized as the case may be.

FIG. 4 shows one example of an appearance of the second controller 36. FIG. 4 (A) is a perspective view when viewing the second controller 36 from above rear, and FIG. 4 (B) is a perspective view when viewing the second controller 36 from below front. Additionally, in FIG. 4, the cable 38 of the second controller 36 is omitted.

The second controller 36 has a housing 86 formed by plastic molding, for example. The housing 86 is formed into an approximately thin long elliptical shape in the forward and backward direction when viewed from plane (Z-axis direction in FIG. 4), and the width of the right and left direction (X-axis direction in FIG. 4) at the back end is narrower than that of the front end. Furthermore, the housing 86 has a curved shape as a whole when viewed from a side, and downwardly curved from a horizontal portion at the front end to the back end. The housing 86 has a size small enough to be held by one hand of a child and an adult similar to the first controller 34 as a whole, and has a longitudinal length (in the Z-axis direction) slightly shorter than that of the housing 78 of the first controller 34. Even with the second controller 36, the player can perform a game operation by operating buttons and a stick, and by changing a position and a direction of the controller itself.

At the end of the top surface of the housing 86, an analog joystick 88*a* is provided. At the end of the housing 86, a front edge slightly inclined backward is provided, and on the front edge is provided a Z button 88*b* and a C button 88*c* vertically arranged (Y-axis direction in FIG. 4). The analog joystick 88*a* and the respective buttons 88*b* and 88*c* are assigned appropriate functions according to a game program to be executed by the game apparatus 12. The analog joystick 88*a* and the respective buttons 88*b* and 88*c* provided to the second controller 36 may be inclusively denoted by means of the reference numeral 88.

Inside the housing 86 of the second controller 36, an acceleration sensor 90 (FIG. 5) is included. As the acceleration sensor 90, an acceleration sensor similar to the acceleration sensor 84 in the first controller 34 is applied. More specifically, the three-axis acceleration sensor is applied, and detects the respective accelerations in the directions of three axes of an up and down direction (Y-axial direction shown in FIG. 4), a right and left direction (X-axial direction shown in FIG. 4), and a forward and rearward direction (Z-axial direction shown in FIG. 4) of the second controller 36. Accordingly, similar to the first controller 34, the acceleration detected for each axis is subjected to an appropriate arithmetic process to thereby calculate a slope and a rotation of the second controller 36 and an orientation of the acceleration sensor 90 with respect to the direction of gravity.

Additionally, the shapes of the first controller 34 shown in FIG. 3 and the second controller 36 shown in FIG. 4 and the shape, the number and the setting position of the buttons (switches, stick, or the like) are merely one example, and can be changed to other shapes, numbers and setting positions, etc. as needed.

Furthermore, the controller 14 is powered by a battery (not illustrated) detachably incorporated in the first controller 34. The second controller 36 is powered through the connector 42, the connector 40, and the cable 38.

Figure 5:
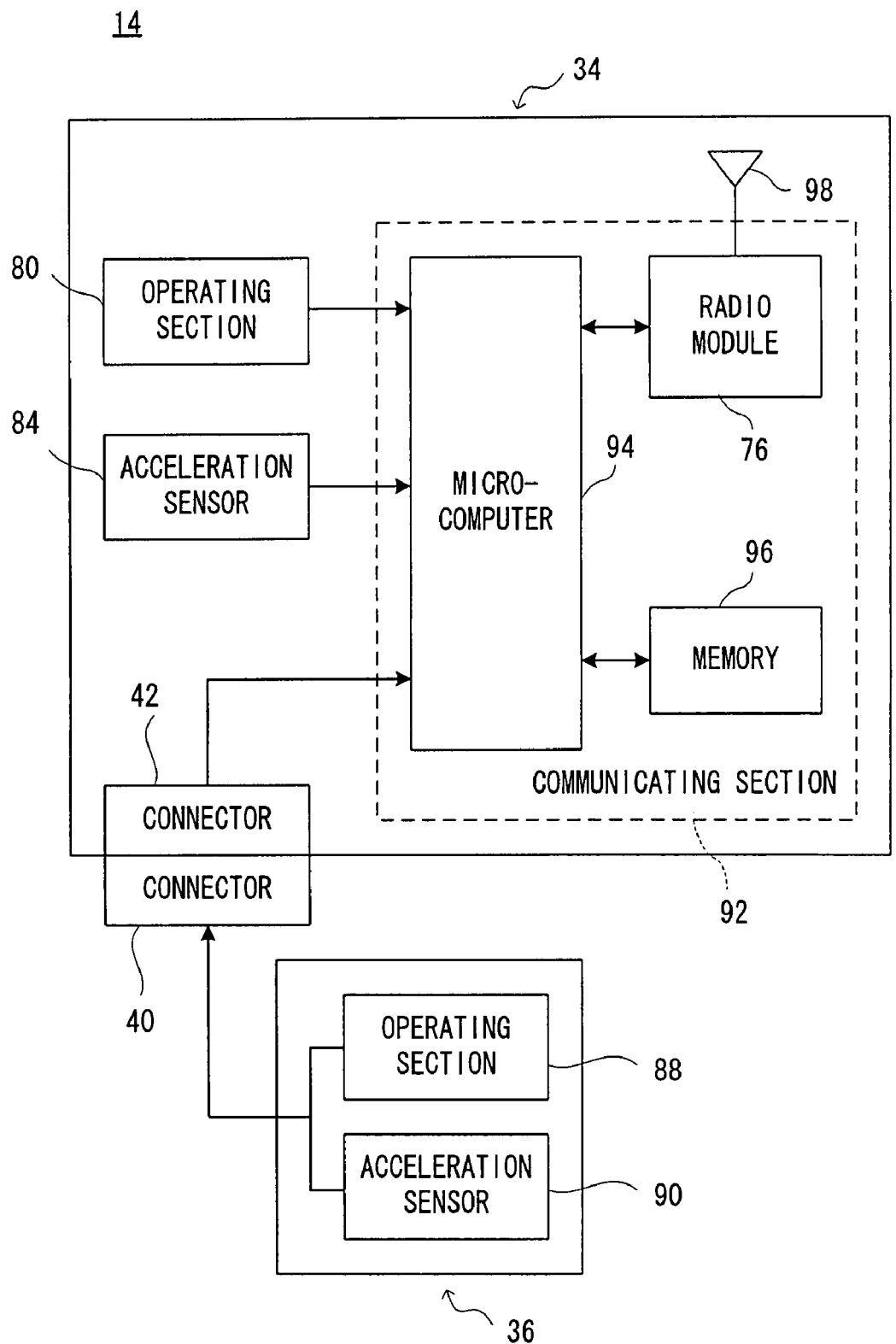
FIG. 5 is a block diagram showing an example of the electrical construction of the controller.

FIG. 5 shows one example of an electric configuration of the controller 14 when the first controller 34 and the second controller 36 are connected with each other.

The first controller 34 incorporates a communicating section 92, and the communicating section 92 is connected with the operating section 80, the acceleration sensor 84, and the connector 42. The operating section 80 indicates the above-described operation buttons or operating switches 80*a*-80*i*. When the operating section 80 is operated, a manipulate signal is applied to the communicating section 92.

The data indicative of acceleration detected by the acceleration sensor 84 is output to the communicating section 92. The acceleration sensor 84 has in the order of a maximum sampling period of 200 frames per second, for example.

The connector 42 is connected with the connector 40 of the cable 38 extending from the second controller 36. The connector 40 is connected with the operating section 88 and the acceleration sensor 90 of the second controller 36. The operating section 88 denotes the above-described stick 88*a* and operation buttons 88*b* and 88*c*. When the operating section 88 is operated, a manipulate signal is applied to the communicating section 92 via the cable 38, the connector 40, the connector 42, etc. The acceleration sensor 90 also has a sampling period similar to that of the acceleration sensor 84, and applies the data indicative of the detected acceleration to the communicating section 92.

The communicating section 92 includes a microcomputer (micon) 94, a memory 96, a radio module 76 and an antenna 98. The micon 94 transmits the obtained data to the game apparatus 12 and receives data from the game apparatus 12 by controlling the radio module 76 while using the memory 96 as a memory area (working area and buffer area) in processing.

The data output from the operating section 80 and the acceleration sensor 84, and the operating section 88 and the acceleration sensor 90 to the micon 94 is temporarily stored in the memory 96. The radio transmission from the communicating section 92 to the Bluetooth communication unit 74 of the game apparatus 12 is performed every predetermined cycle. Note that the game processing is generally performed by regarding 1/60 seconds as a unit, and therefore, it is necessary to perform the transmission from the first controller 34 at a cycle equal to or shorter than it. The micon 94 outputs data including the operation data of the operating sections 80 and 88 and the acceleration data of the acceleration sensors 84 and 90 stored in the memory 96 to the radio module 76 as controller data when transmission timing to the game apparatus 12 has come. The radio module 76 modulates a carrier of a predetermined frequency by the controller data, and emits its weak radio wave signal from the antenna 98 by using a short-range wireless communication technique, such as Bluetooth (trademarks). Namely, the controller data is modulated to the weak radio wave signal by the radio module 76 and transmitted from the first controller 34. The weak radio wave signal is received by a Bluetooth communication unit 74 of the game apparatus 12. The weak radio wave thus received is subjected to demodulating and decoding processing, thus making it possible for the game apparatus 12 to obtain the controller data. The CPU 44 of the game apparatus 12 performs the game processing on the basis of the controller data obtained from the controller 14. The radio communication between the first controller 34 and the game apparatus 12 may be executed according to other standards, such as a wireless LAN.

Figure 6:
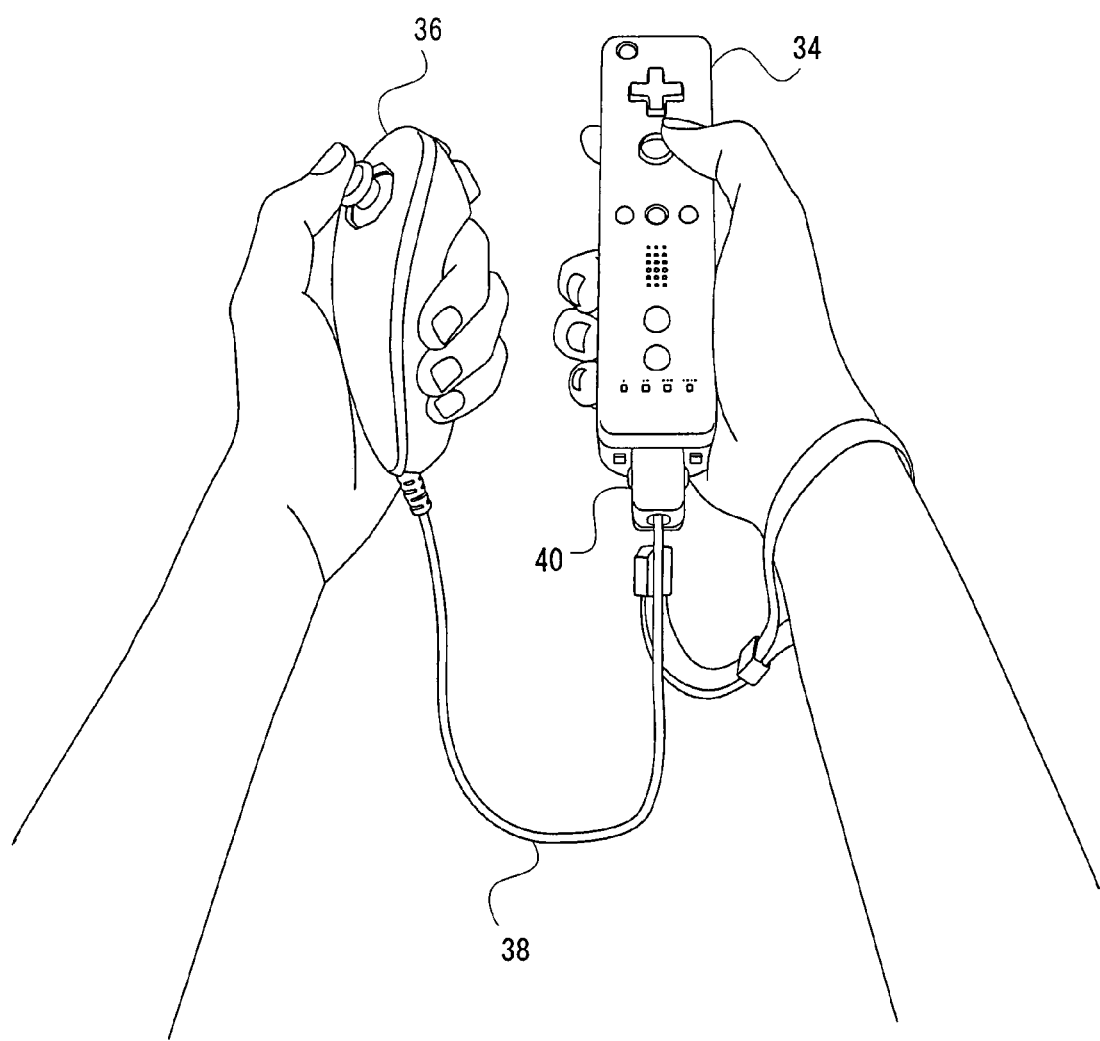
FIG. 6 is an illustrative view showing a first controller and a second controller gripped with the right hand and the left hand of a player.

In the game system 10, an operation or an input to a game can be performed by moving the controller 14 by a player. When the game is played, for example, as shown in FIG. 6, the player grips the first controller 34 with the right hand, and grips the second controller 36 with the left hand. As described above, the acceleration sensor 84 for detecting the acceleration in three-axes directions is built in the first controller 34, and a similar acceleration sensor 90 is also built in the second controller 36. When the first controller 34 and the second controller 36 are moved by the player, an acceleration value showing a motion of each controller itself is detected by the acceleration sensor 84 and the acceleration sensor 90. In the game apparatus 12, the game processing is executed in accordance with the acceleration value thus detected, namely, the motion values of the controllers 34 and 36. In other words, by suitably moving the controller 14, the player can input the acceleration to the game apparatus 12, and the game processing is executed in the game apparatus 12, in accordance with this acceleration input.

In this exemplary embodiment, an action of a player character in the virtual game space is controlled by the motions of the first controller 34 and the second controller 36. Although not shown, the player character grips a sword with the right hand and a shield with the left hand. The player can make the player character perform the motion of swinging the sword in the right hand to right and left by the motion of the first controller 34 in the right hand in a lateral direction (X-axis direction), and can make the player character perform the motion of vertically swinging the sword by the motion of the first controller 34 in a vertical direction (Y-axis direction). In addition, the player can make the player character perform the motion of protruding the shield in the left hand frontward by the motion of the second controller 36 in a front and rear direction (Z-axis direction). Further, as a specific sword technique, the player can make the player character perform the motion of rotating and swinging the sword in the right hand (rotary cut). Thus, in a virtual game of this exemplary embodiment, the player can operate the sword and the shield, respectively as separate objects to be operated, by the first controller 34 and the second controller 36. In addition, the player can operate the sword as the same object to be operated by two controllers (the first controller 34 and the second controller 36).

Each motion of the player character as described above is an attack motion, and is the motion impossible to be executed simultaneously. Accordingly, when each prescribed motion is simultaneously executed by using the first controller 34 and the second controller 36, it is necessary to determine which motion is to be executed by the player character. In this exemplary embodiment, by determining the magnitude of the motion detected by the first controller 34 and the second controller 36, the motion whose motion value is determined to be the maximum value is made to be effective and processed. Thus, the motion corresponding to the maximum motion out of the motions of the first controller 34 and the second controller 36 can be performed by the player character.

Note that in this exemplary embodiment, as described above, the motion of the first controller 34 is mainly corresponded to the operation of the sword gripped with the right hand of the player character, and the motion of the second controller 36 is mainly corresponded to the operation of the shield gripped with the left hand of the player character, and therefore it is a premise for the player to grip the first controller 34 with the right hand and grip the second controller 36 with the left hand. However, in other exemplary embodiments, for example, a handle of each controller may be set selectable in consideration of a dominant hand of the player, and the first controller 34 may be gripped with the dominant hand of the player, and the sword of the player character corresponded to the first controller 34 may be gripped with the hand of the same side as the dominant hand of the player. Namely, when the player is a left-handed person, the first controller 34 is gripped with the left hand, and the second controller 36 is gripped with the right hand.

Figure 7:
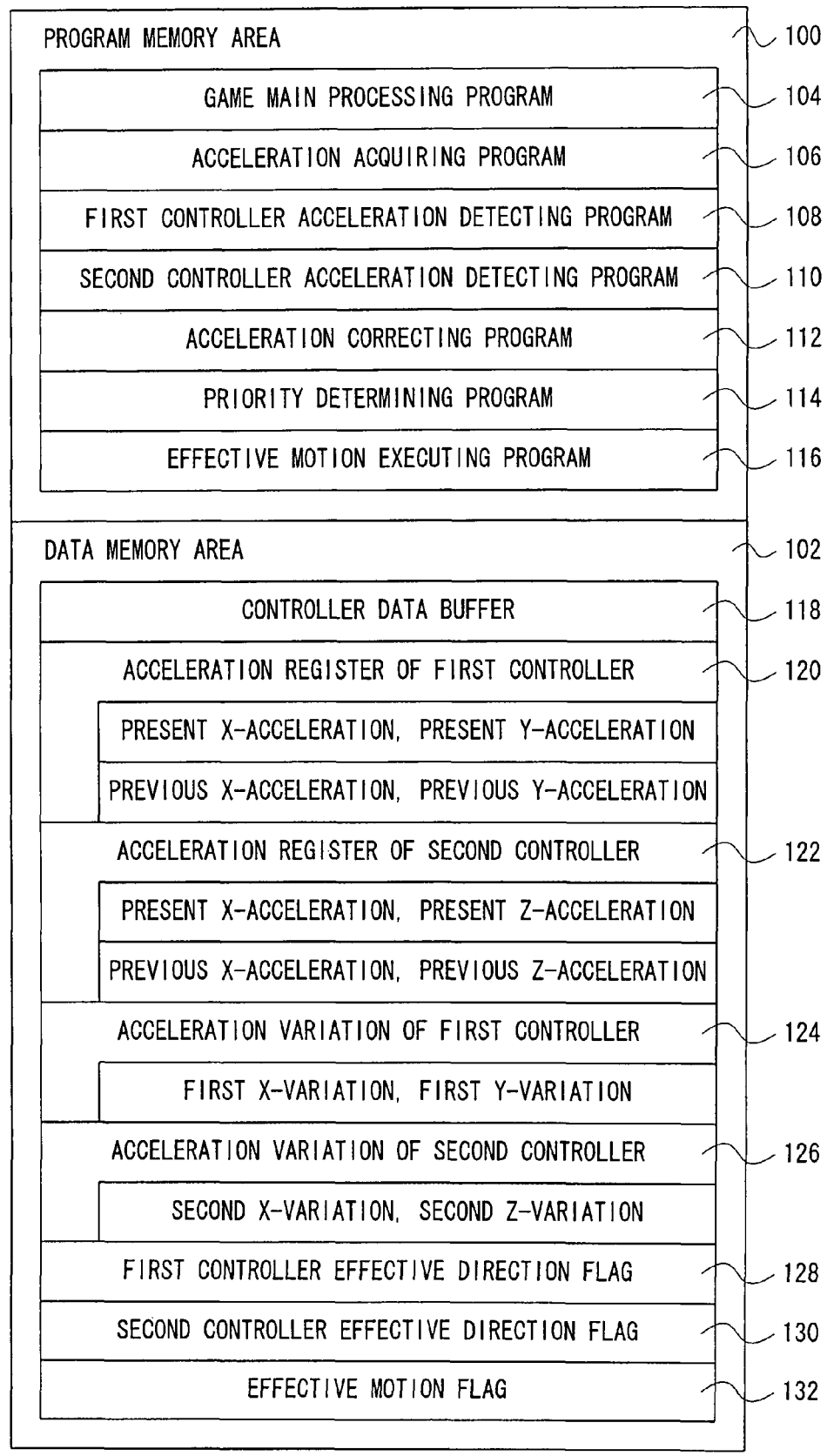
FIG. 7 is an illustrative view showing an example of a memory map.

An example of the memory map for executing the virtual game of this exemplary embodiment is shown in FIG. 7. A main memory 48 includes a program memory area 100 and a data memory area 102. Programs and piece of data are read totally at once or partially as needed and sequentially from an optical disk 22, to be then stored in a main memory 48. Note that FIG. 7 shows only a part of the memory map, and other programs and data required for processing are also stored therein.

In the program memory area 100, a game main processing program for executing a main routine of the game program of this exemplary embodiment is stored in a memory area 104.

An acceleration acquiring program is stored in the memory area 106. By this program, the acceleration detected by the first controller 34 and the second controller 36 is acquired. As described above, controller data from the controller 14 is regularly received through a Bluetooth communication unit 74. The controller data thus received is stored in a controller data buffer 118 of the data memory area 102. The controller data includes input data of the first controller 34 and the input data of the second controller 36, and therefore the controller data includes the data showing the acceleration detected by the acceleration sensor 84 of the first controller 34 and the data showing the acceleration detected by the acceleration sensor 90 of the second controller 36. By this program, the acceleration of each controller from the controller data is acquired for each one frame. Note that as described above, by the acceleration sensors 84 and 90, the acceleration of each axis is detected at sampling periods (such as 1/200 seconds) shorter than one frame (such as 1/60 seconds) of the game apparatus 12. Therefore, a plurality of acceleration values is included in the controller data for each axis. Accordingly, by extracting a suitable value such as an average value, a maximum value, and a minimum value, the acceleration of each axis in the present frame is acquired. Each axial acceleration of the first controller 34 thus acquired is stored in an acceleration register 120 of the first controller, and each axial acceleration of the second controller 36 is stored in an acceleration register 122 of the second controller.

A first controller acceleration detecting program is stored in the memory area 108. By this program, an effective motion of the first controller 34 is detected. In this exemplary embodiment, the moving direction of the first controller 34 is detected. Specifically, the magnitude of the acceleration in each axial direction detected by the acceleration sensor 84 of the first controller 34 is determined, and the axial direction corresponding to the maximum value is specified as the moving direction of the first controller 34. In addition, in this exemplary embodiment, the magnitude of the acceleration is not determined by the acceleration acquired by the present frame, but is determined by calculating the variation of each axial acceleration between the previous frame and the present frame, and by the magnitude of variation of each axis thus calculated. By comparing the magnitude of the acceleration variation of each axis per unit time (one frame in this exemplary embodiment), detection accuracy of the motion can be improved without being influenced by a gravitational acceleration detected even in a stationary state. The specified moving direction is recognized as an effective operation in the first controller 34, and information showing this moving direction is set in a first controller effective direction flag.

A second controller acceleration detecting program is stored in a memory area 110. By this program, an effective motion in the second controller 36 is detected, and in this exemplary embodiment, the moving direction of the second controller 36 is detected. Specifically, processing similar to the detection of the moving direction of the aforementioned first controller 34 is executed, namely, the magnitude of the acceleration variation of each axis is determined, and the axial direction corresponding to the maximum variation is specified as the moving direction of the second controller 36. The moving direction thus specified is recognized as the effective operation in the second controller 36, and the information showing this moving direction is set in the second controller effective direction flag.

An acceleration correcting program is stored in a memory area 112. By this program, the acceleration variations of respective axes, to be compared for detecting each moving direction of the first controller 34 and the second controller 36, are corrected. Not all acceleration variations are necessarily corrected, and the acceleration variations in at least one axial direction may be corrected as needed. Correction is made, for example, by multiplying the calculated acceleration variation by a constant, to thereby increase or decrease the magnitude of the acceleration variation. Accordingly, by performing this correction to the motion value in a specific axial direction or of a specific controller, the motions in the specific axial direction and of the specific controller can be made to be easily effective, or conversely can be made hard to be effective. For example, in this exemplary embodiment, it is defined such that only the acceleration variation in the X-axial direction of the second controller 36 is corrected, and the motion in the X-axial direction of the second controller 36 is more easily prioritized than the other motion. As described above, the motion in the X-axial direction of the second controller 36 is corresponded to a rotary cutting motion as a specific attack of the player character, and therefore in the virtual game of this exemplary embodiment, the specific attack is easily set in motion.

A priority determining program is stored in a memory area 114. By this program, it is determined which of the motions detected by a plurality of controllers is prioritized. Specifically, the magnitude of each motion is determined, and the motion showing the maximum value is specified as the effective motion. In this exemplary embodiment, by the aforementioned first controller acceleration detecting program and the second controller acceleration detecting program, the moving directions of the first controller 34 and the second controller 36 are respectively detected. Therefore, the magnitude of the acceleration variation corresponding to the moving direction of the first controller 34 and the acceleration variation corresponding to the moving direction of the second controller 36 are determined, and the motion with larger acceleration variation is specified as effective. The motion thus specified is recognized as the effective operation out of the motions of a plurality of controllers 34 and 36, and the information showing this motion is set in the effective motion flag.

An effective motion executing program is stored in a memory area 116. By this program, the motion specified as the effective operation is processed. In this exemplary embodiment, the game processing based on the effective motion is executed, and an action as described above corresponded to this motion is made to be executed by the player character.

A memory area 118 of the data memory area 102 is a controller data buffer, and received controller data is stored therein. The aforementioned acceleration acquiring program acquires the acceleration in the present frame from the controller data.

A memory area 120 is an acceleration register of the first controller 34, and includes a present X-acceleration register for storing an X-axial acceleration value acquired by the present frame; a present Y-acceleration register for storing a Y-axial acceleration value acquired by the present frame; a previous X-acceleration register for storing an X-axial acceleration value acquired by the previous frame; and a previous Y-acceleration register for storing a Y-axial acceleration value acquired by the previous frame. Note that in this exemplary embodiment, a Z-axial acceleration of the first controller 34 is not corresponded to the motion of the player character, and therefore is not registered in the memory area 120.

A memory area 122 is the acceleration register of the second controller 36, and includes a present X-acceleration register for storing the X-axial acceleration value acquired by the present frame; a present Z-acceleration register for storing the Z-axial acceleration value acquired by the present frame; a previous X-acceleration register for storing the X-axial acceleration value acquired by the previous frame; and a previous Z-acceleration register for storing the Z-axial acceleration value acquired by the previous frame. Note that in this exemplary embodiment, the Y-axial acceleration of the second controller 36 is not corresponded to the motion of the player character, and therefore is not registered in the memory area 122.

The acceleration variation of the first controller 34 is stored in a memory area 124. In this exemplary embodiment, a first X-variation showing a variation of the X-axial acceleration, and a first Y-variation showing a variation of the Y-axial acceleration are stored. The acceleration variation is calculated by obtaining a difference between acceleration values of the present frame and the previous frame of the acceleration register 120 of the first controller.

The acceleration variation of the second controller 36 is stored in a memory area 126. In this exemplary embodiment, a second X-variation showing the variation of the X-axial acceleration, and a second Z-variation showing the variation of the Z-axial acceleration are stored. The acceleration variation is calculated by obtaining a difference between acceleration values of the present frame and the previous frame of the acceleration register 122 of the second controller.

In addition, when the correction by the acceleration correcting program is made, a corrected value is stored in the memory area 124 and the memory area 126.

A first controller effective direction flag is stored in a memory area 128. This flag shows the effective moving direction of the first controller 34. In this exemplary embodiment, "1" is stored when the effective moving direction is the X-axial direction, and "2" is stored when the effective moving direction is the Y-axial direction.

A second controller effective direction flag is stored in a memory area 130. This flag shows the effective moving direction of the second controller 36. In this exemplary embodiment, "1" is stored when the effective moving direction is the X-axial direction, and "3" is stored when the effective moving direction is the Z-axial direction.

An effective motion flag is stored in a memory area 132. This flag shows the effective moving direction out of moving directions of the first controller 34 and the second controller 36. In this exemplary embodiment, "1" and "2" are respectively stored when effective moving directions are the X and Y-axes directions of the first controller 34, and "3" and "4" are respectively stored when the effective moving directions are the X and Z-axes directions of the second controller 36.

Figure 8:
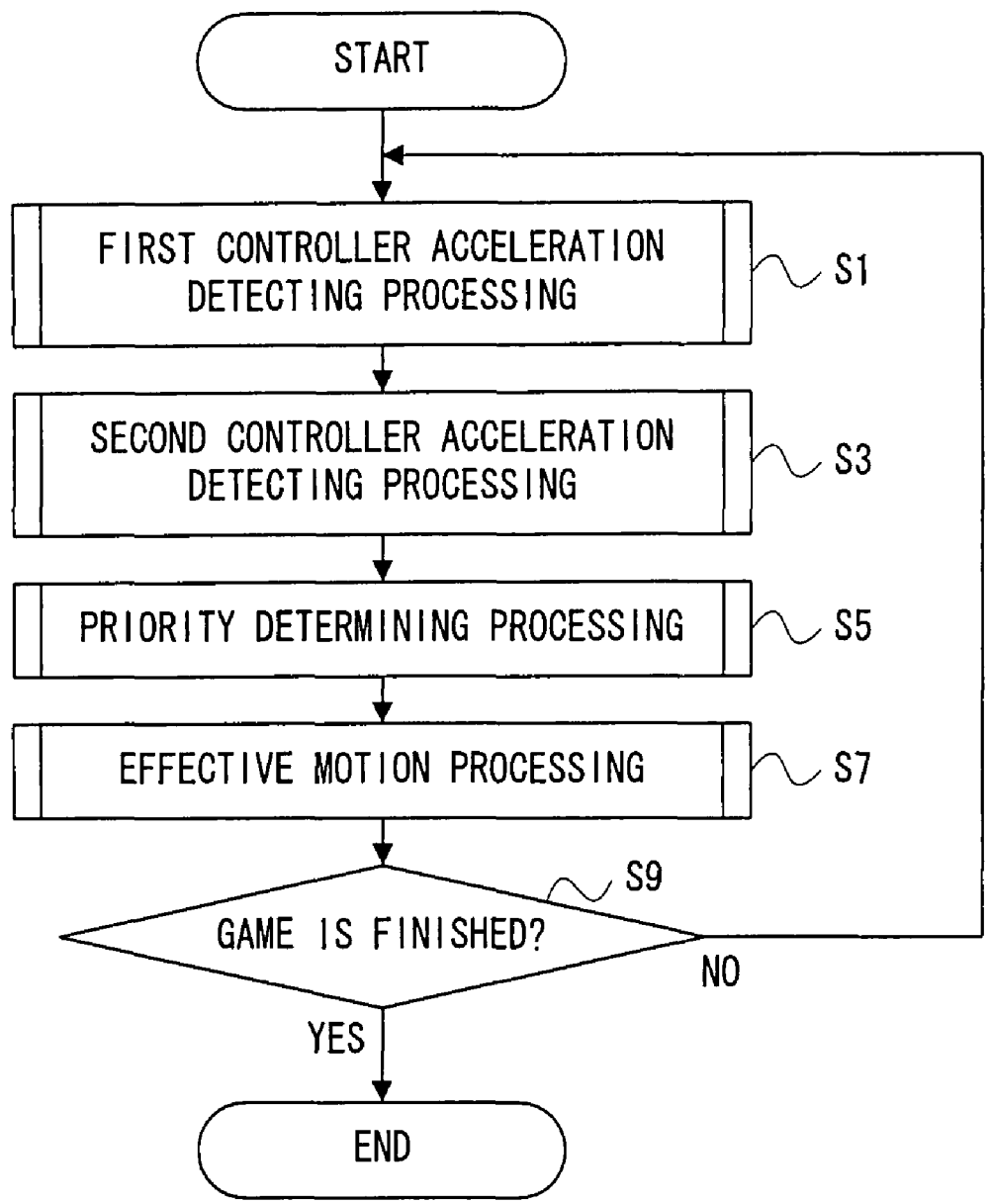
FIG. 8 is a flowchart showing an example of a game operation of a CPU of a game apparatus.

FIG. 8 shows an example of a game operation of the CPU 44 of the game apparatus 12. The processing from the steps S1 to S9 of FIG. 8 is executed per unit time (one frame). When the processing starts, in a step S1, the CPU 44 executes a first controller acceleration detecting processing, and the effective motion of the first controller 34 is thereby detected. Details of the first controller acceleration detecting processing are shown in FIG. 9.

Figure 9:
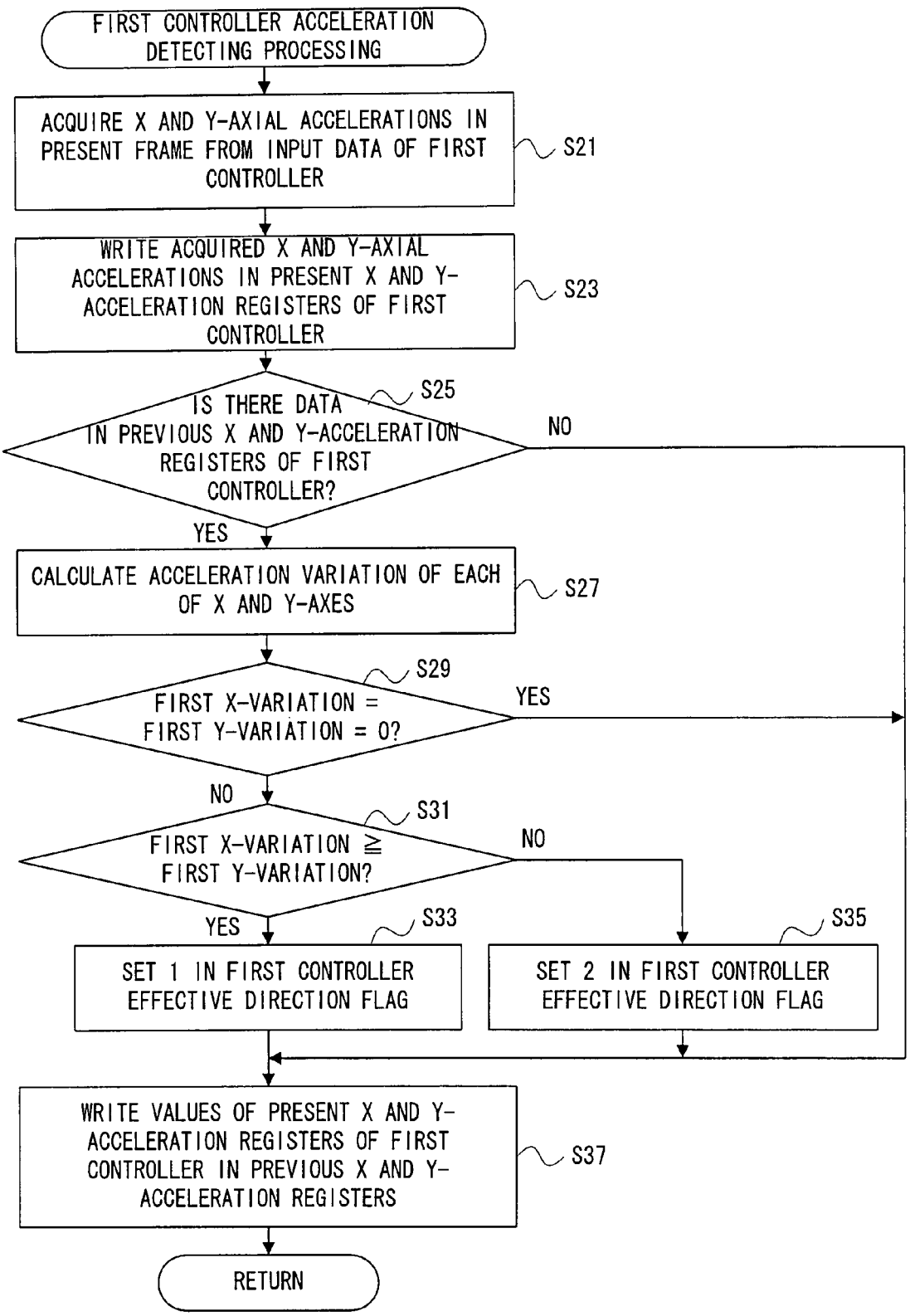
FIG. 9 is a flowchart showing an example of an operation of a first controller acceleration detecting processing of FIG. 8.

In a step S21 of FIG. 9, the CPU 44 acquires the X-axial acceleration and the Y-axial acceleration in the present frame, from input data of the first controller 34 stored in the memory area 118. Next, in a step S23, the CPU 44 writes the acquired X-axial acceleration and the Y-axial acceleration in the present X-acceleration register and the present Y-acceleration register of the acceleration register 120 of the first controller, respectively.

Subsequently, in a step S25, the CPU 44 determines whether or not the data is stored in the previous X-acceleration register and the previous Y-acceleration register of the acceleration register 120 of the first controller. If "NO" in the step S25, the process advances to a step S37.

Meanwhile, if "YES" in the step S25, the CPU 44 refers to the acceleration register 120 of the first controller and calculates each acceleration variation of the X and Y-axes. The first X-variation showing the variation of the X-axial acceleration is calculated by subtracting the previous X-acceleration from the present X-acceleration and stored in the memory area 124. Also, the first Y-variation showing the variation of the Y-axial acceleration is calculated by subtracting the previous Y-acceleration from the present Y-acceleration and stored in the memory area 124.

In the subsequent steps S29 to S35, the magnitude of the acceleration variation is determined and the direction corresponding to the maximum value is specified as the moving direction of the first controller 34. Specifically, in a step S29, the CPU 44 determines whether or not the first X-variation and the first Y-variation are equal to "0". If "YES" in the step S29, namely when there is no change in acceleration in both directions of the X-axial direction and the Y-axial direction, it is regarded that a new motion using the first controller 34 is not started, and therefore the process advances to the step S37 as it is.

If "NO" in the step S29, the CPU 44 determines whether or not the first X-variation is equal to or more than the first Y-variation in a step S31. If "YES" in the step S31, namely, when the first X-variation is determined to be maximum, the X-axial direction is specified as the moving direction of the first controller 34. The CPU 44 sets "1" in the first controller effective direction flag in a step S33. Namely, the CPU 44 stores in the memory area 128 the value "1" showing the X-axial direction.

Meanwhile, if "NO" in the step S31, namely, when the first Y-variation is determined to be maximum, the Y-axial direction is specified as the moving direction of the first controller 34. The CPU 44 sets "2" in the first controller effective direction flag in a step S35. Namely, the CPU 44 stores in the memory area 128 the value "2" showing the Y-axial direction.

Subsequently, in the step S37, in order to calculate the variation in the next frame, the CPU 44 writes the values of the present X-acceleration register and the present Y-acceleration register of the acceleration register 120 of the first controller, in the previous X-acceleration register and the previous Y-acceleration register. When the first controller acceleration detecting processing is completed, the process returns to a step S3 of FIG. 8.

In the step S3 of FIG. 8, the CPU 44 executes a second controller acceleration detecting processing, and thus an effective motion of the second controller 36 is detected. Details of the second controller acceleration detecting processing are shown in FIG. 10.

Figure 10:
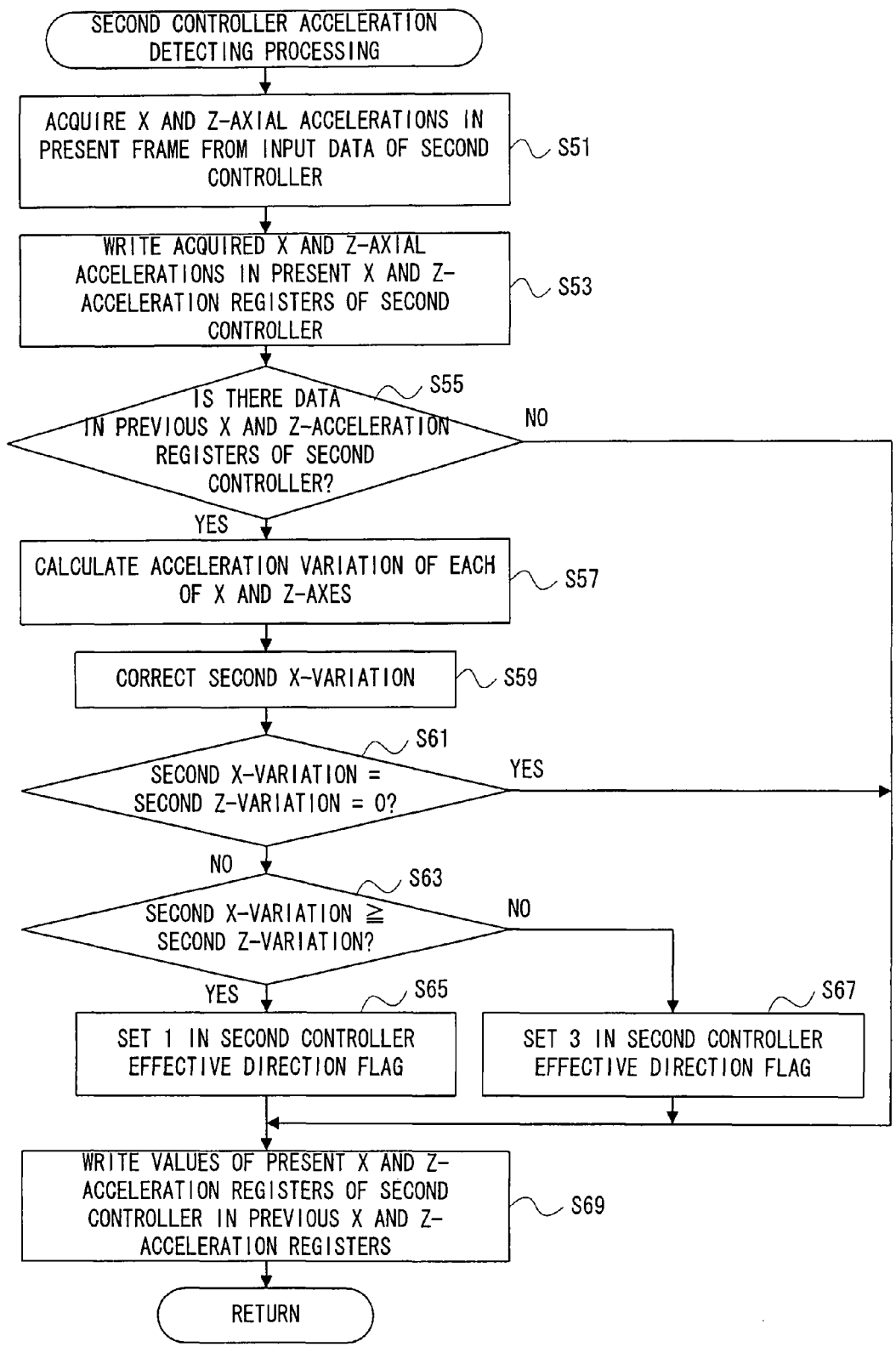
FIG. 10 is a flowchart showing an example of an operation of a second controller acceleration detecting processing of FIG. 8.

In a step S51 of FIG. 10, the CPU 44 acquires the X-axial acceleration and the Z-axial acceleration in the present frame from the input data of the second controller stored in the memory area 118. Next, in a step S53, the CPU 44 writes the acquired X-axial acceleration and the Z-axial acceleration in the present X-acceleration register and the present Z-acceleration register of the acceleration register 122 of the second controller, respectively.

Subsequently, in a step S55, the CPU 44 determines whether or not data is stored in the previous X-acceleration register and the previous Z-acceleration register of the acceleration register 122 of the second controller. If "NO" in the step S55, the processing advances to a step S69.

Meanwhile, if "YES" in the step S55, the CPU 44 refers to the acceleration register 122 of the second controller and calculates each acceleration variation of the X-axis and Z-axis. The second X-variation showing the variation of the X-axial acceleration is calculated by subtracting the previous X-acceleration from the present X-acceleration, and stored in the memory area 126. In addition, the second Z-variation showing the variation of the Z-axial acceleration is calculated by subtracting the previous Z-acceleration from the present Z-acceleration and stored in the memory area 126.

Further, in a step S59, the CPU 44 corrects the second X-variation. For example, a corrected value is calculated by multiplying the second X-variation stored in the memory area 126 by a constant (such as 1.4), and this corrected value is stored in the memory area 126 as the second X-variation. Thus, in this exemplary embodiment, the motion in the X-axial direction of the second controller 36 is defined so as to be easily effective, and accordingly, the game processing (rotary cutting motion of the player character) corresponded to the motion of the second controller in the X-axial direction is easily set in motion.

In the subsequent steps S61 to S67, the CPU 44 determines the magnitude of the acceleration variation and specifies the direction corresponding to the maximum value as the moving direction of the second controller 34. Specifically, in a step S61, the CPU 44 determines whether or not the second X-variation and the second Z-variation are equal to "0". If "YES" in the step S61, namely, when there is no change in acceleration in both directions of the X-axial direction and the Z-axial direction, it is regarded that a new motion using the second controller 36 is not started, and therefore the process advances to the step S69 as it is.

If "NO" in the step S61, the CPU 44 determines whether or not the second X-variation is equal to or more than the second Z-variation in a step S63. If "YES" in the step S63, namely, when the second X-variation is determined to be maximum, the X-axial direction is specified as the moving direction of the second controller 36. In a step S65, the CPU 44 sets "1" in the second controller effective direction flag. Namely, the CPU 44 stores "1" showing the X-axial direction, in the memory area 130.

Meanwhile, if "NO" in the step S63, namely, when the second Z-variation is determined to be maximum, the Z-axial direction is specified as the moving direction of the second controller 36. The CPU 44 sets "3" in the second controller effective direction flag in a step S67. Namely, the CPU 44 stores the value "3" showing the Z-axial direction, in the memory area 130.

Subsequently, in the step S69, in order to calculate the variation in the next frame, the CPU 44 writes the values of the present X-acceleration register and the present Z-acceleration register of the acceleration register 122 of the second controller, in the previous X-acceleration register and the previous Z-acceleration register, respectively. When this second controller acceleration detecting processing is completed, the process returns to a step S5 of FIG. 8.

In the step S5 of FIG. 8, the CPU 44 executes a priority determining processing, and thus determines which of the motions of the first controller 34 and the second controller 36 is regarded as effective. Details of the priority determining processing are shown in FIG. 11 and FIG. 12.

Figure 11:
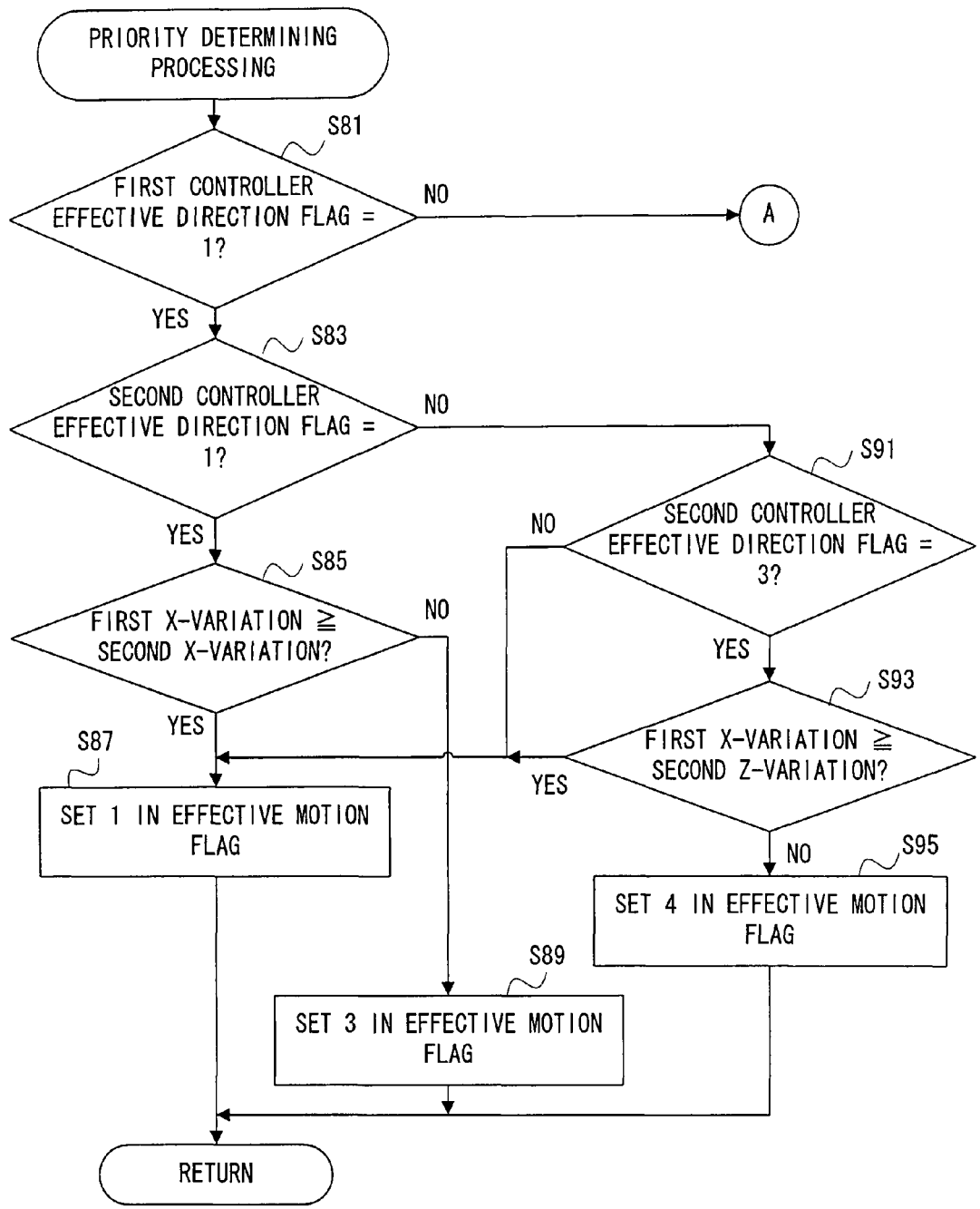
FIG. 11 is a flowchart showing a part of an example of an operation of a priority determining processing of FIG. 8.

In a step S81 of FIG. 11, the CPU 44 refers to the memory area 128 and determines whether or not "1" is set in the first controller effective direction flag. If "YES" in the step S81, namely, when the moving direction of the first controller 34 is the X-axial direction, in a step S83, the CPU 44 refers to the memory area 130 and determines whether or not "1" is set in the second controller effective flag. If "YES" in the step S83, namely, when the moving direction of the second controller 36 is the X-axial direction, in a step S85, the CPU 44 refers to the memory areas 124 and 126, and determines whether or not the first X-variation is equal to or more than the second X-variation. If "YES" in the step S85, namely, when the first X-variation is determined to be maximum, the motion of the first controller 34 in the X-axial direction is determined to be effective, and the CPU 44 sets "1" in the effective motion flag in a step S87. Namely, the CPU 44 stores in the memory area 132 the value "1" showing the motion of the first controller 34 in the X-axial direction. Meanwhile, if "NO" in the step S85, namely, when the second X-variation is determined to be maximum, the motion of the second controller 36 in the X-axial direction is determined to be effective, and in a step S89, the CPU 44 sets "3" in the effective motion flag. Namely, the CPU 44 stores in the memory area 132 the value "3" showing the motion of the second controller 36 in the X-axial direction. Meanwhile, if "NO" in the step S83, the CPU 44 determines whether or not "3" is set in the second controller effective direction flag in a step S91. If "YES" in the step S91, namely, when the moving direction of the second controller 36 is the Z-axial direction, the CPU 44 determines whether or not the first X-variation is equal to or more than the second Z-variation in a step S93. If "NO" in the step S93, namely, when the second Z-variation is determined to be maximum, the motion of the second controller 36 in the Z-axial direction is determined to be effective, and the CPU 44 sets "4" in the effective motion flag in a step S95. Namely, the CPU 44 stores in the memory area 132 "4" showing the motion of the second controller 36 in the Z-axial direction.

Also, if "YES" in the step S93, namely, when the first X-variation is determined to be maximum, the process advances to the aforementioned step S87. Further, if "NO" in the step S91, namely, when the effective moving direction of the second controller 36 is not specified (the motion is not performed), the first X-variation is determined to be maximum, and therefore the process advances to the step S87. When the processing of the steps S87, S89, or S95 is completed, the priority determining processing is completed, and the process returns to a step S7 of FIG. 8.

Figure 12:
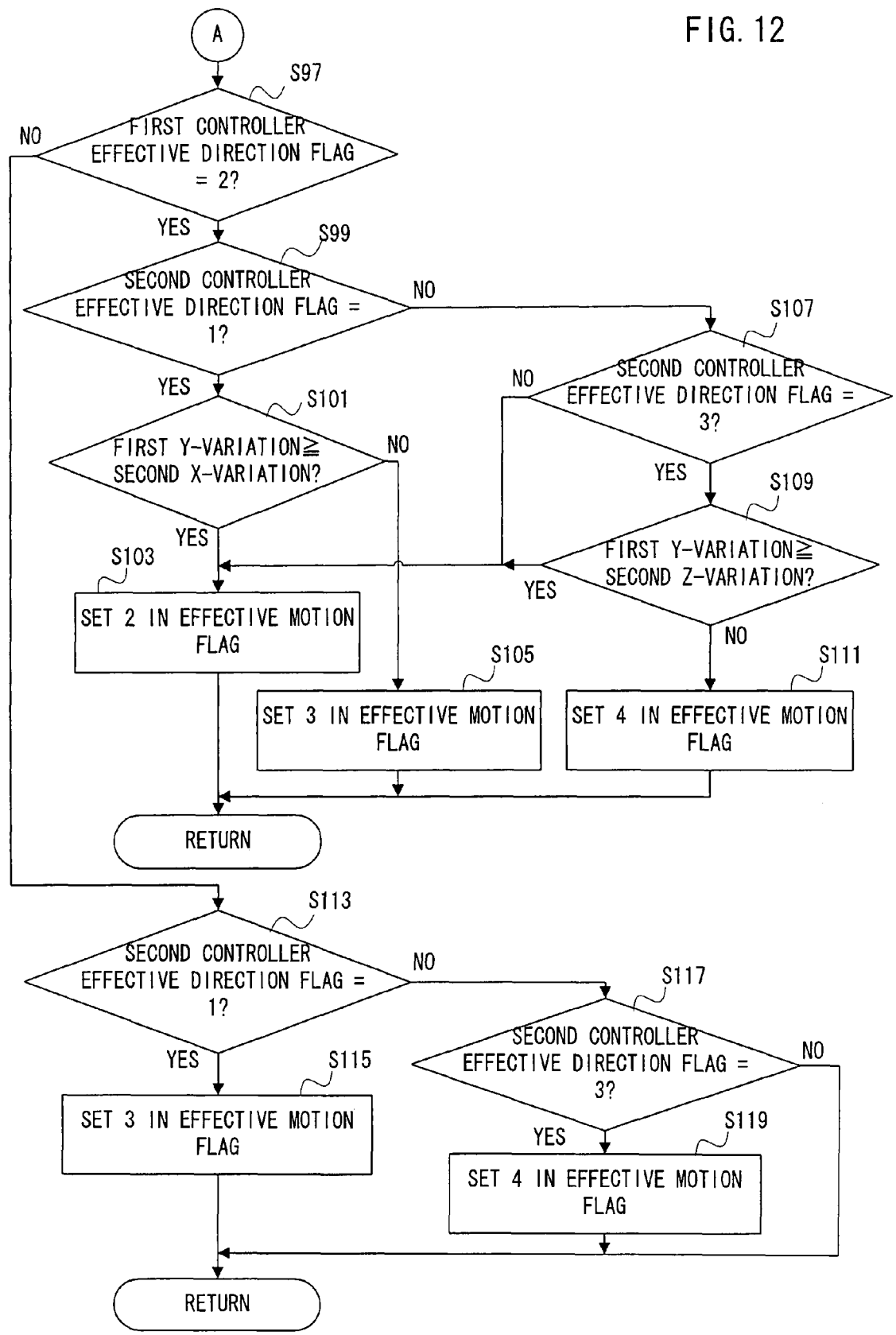
FIG. 12 is a flowchart showing a continuation of FIG. 11.

In addition, if "NO" in the step S81, in a step S97 of FIG. 12, the CPU 44 determines whether or not "2" is set in the first controller effective direction flag. If "YES" in the step S97, namely, when the moving direction of the first controller 34 is the Y-axial direction, the CPU 44 determines whether or not "1" is set in the second controller effective direction flag in a step S99. If "YES" in the step S99, namely, when the moving direction of the second controller 36 is the X-axial direction, the CPU 44 determines whether or not the first Y-variation is equal to or more than the second X-variation in a step S101. If "YES" in the step S101, namely, when the first Y-variation is determined to be maximum, the motion of the first controller 34 in the Y-axial direction is determined to be effective, and the CPU 44 sets "2" in the effective motion flag in a step S103. Namely, the CPU 44 stores in the memory area 132 the value "2" showing the motion of the first controller 34 in the Y-axial direction. Meanwhile, if "NO" in the step S101, namely, when the second X-variation is determined to be maximum, the motion of the second controller 36 in the X-axial direction is determined to be effective, and the CPU 44 sets "3" in the effective motion flag in a step S105.

Meanwhile, if "NO" in the step S99, the CPU 44 determines whether or not "3" is set in the second controller effective direction flag in a step S107. If "YES" in the step S107, namely, when the moving direction of the second controller 36 is the Z-axial direction, the CPU 44 determines whether or not the first Y-variation is equal to or more than the second Z-variation in a step S109. If "NO" in the step S109, namely, when the second Z-variation is determined to be maximum, the motion of the second controller 36 in the Z-axial direction is determined to be effective, and the CPU 44 sets "4" in the effective motion flag in a step S111.

In addition, if "YES" in the step S109, namely, when the first Y-variation is determined to be maximum, the process advances to the aforementioned step S103. Also, if "NO" in the step S107, namely, when the effective moving direction of the second controller 36 is not specified, the first Y-variation is determined to be maximum, and therefore the process advances to the aforementioned step S103. When the processing of the steps S103, S105, or S111 is completed, the priority determining processing is completed, and the process returns to a step S7 of FIG. 8.

Meanwhile, if "NO" in the step S97, namely, when the effective moving direction of the first controller 34 is not specified, the CPU 44 determines whether or not "1" is set in the second controller effective direction flag in a step S113. If "YES" in the step S113, as the moving direction of the second controller 36, the motion corresponding to the X-axial direction is determined to be maximum, and therefore the motion of the second controller 36 in the X-axial direction is determined to be the effective motion of the second controller 36 in the X-axial direction. The CPU 44 sets "3" in the effective motion flag in a step S115.

In addition, if "NO" in the step S113, the CPU 44 determines whether or not "3" is set in the second controller effective direction flag in a step S117. If "YES" in the step S117, the motion corresponding to the Z-axial direction is determined to be maximum as the moving direction of the second controller 36, and therefore the motion of the second controller 36 in the Z-axial direction is determined to be the effective motion. The CPU 44 sets "4" in the effective motion flag in a step S119. When the processing of the step S115 or the step S119 is completed, the priority determining processing is completed, and the process returns to the step S7 of FIG. 8.

Also, if "NO" in the step S117, namely, when the effective moving direction is not specified in the second controller 36, it is not possible to determine the effective motion in all controllers. Therefore, the priority determining processing is completed without setting the effective motion flag.

In the step S7 of FIG. 8, the CPU 44 executes the effective motion processing, and thus the game processing corresponding to the effective motion is executed. Details of the effective motion processing are shown in FIG. 13.

Figure 13:
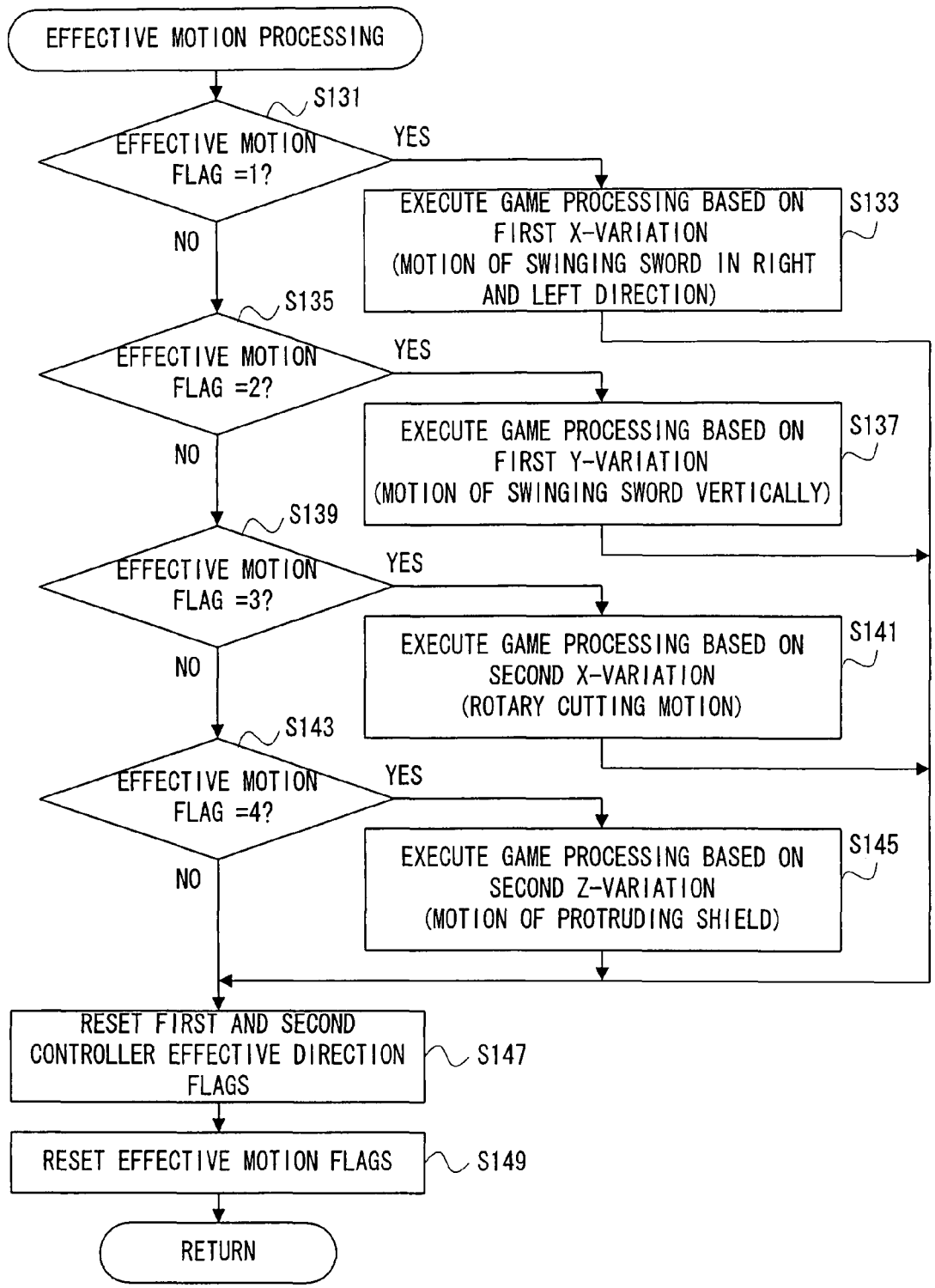
FIG. 13 is a flowchart showing a part of an example of an operation of an effective motion processing of FIG. 8.

In a step S131 of FIG. 13, the CPU 44 refers to the memory area 132, and determines whether or not "1" is set in the effective motion flag. If "YES" in the step S131, namely, when the motion of the first controller 34 in the X-axial direction is effective, the CPU 44 executes the game processing based on the first X-variation in a step S133. Thus, an image of performing the motion of swinging a sword in right and left direction by the player character is generated and displayed on the monitor 34.

If "NO" in the step S131, the CPU 44 determines whether or not "2" is set in the effective motion flag in a step S135. If "YES" in the step S135, namely, when the motion of the first controller 34 in the Y-axial direction is effective, the CPU 44 executes the game processing based on the first Y-variation in a step S137. Thus, the image of performing the motion of swinging the sword vertically by the player character is generated and displayed on the monitor 34.

If "NO" in the step S135, the CPU 44 determines whether or not "3" is set in the effective motion flag in a step S139. If "YES" in the step S139, namely when the motion of the second controller 36 in the X-axial direction is effective, the CPU 44 executes the game processing based on the second X-variation in a step S141. Thus, the image of performing the motion of rotating and swinging the sword by the player character is generated and displayed on the monitor 34.

If "NO" in the step S139, the CPU 44 determines whether or not "4" is set in the effective motion flag in a step S143. If "YES" in the step S143, namely when the motion of the second controller 36 in the Z-axial direction is effective, the CPU 44 executes the game processing based on the second Z-variation. Thus, the image of performing the motion of protruding the shield frontward (shield attack) by the player character is generated and displayed on the monitor 34.

When the processing of the steps S133, S137, S141 or S145 is completed, or if "NO" in the step S143, the CPU 44 resets the first controller effective direction flag and the second controller effective direction flag in a step S147. Further, in a step S149, the CPU 44 resets the effective motion flag. When the effective motion processing is completed, the process returns to a step S9 of FIG. 8.

In the step S9 of FIG. 8, the CPU 44 determines whether or not the game is finished. For example, whether or not satisfying a game clear condition or a game over condition is determined If "NO" in the step S9, the process returns to the step S1 to continue the game. Meanwhile, if "YES", the game is finished.

According to this exemplary embodiment, the maximum motion out of the motions of a plurality of controllers 34 and 36 is processed as effective, and therefore the motions of the controllers 34 and 36 with maximum motions can be reflected on the game. In addition, it is possible to perform a new operation of, by moving the plurality of controllers 34 and 36 for detecting the motion, making as effective only the operation with the maximum motion. In a case of the game fighting with the aforementioned sword and shield, for example, the player can set rotary cutting in motion or protrude the shield by strongly or largely moving the second controller 36 in the left hand at a desired timing, while continuing the attack to the enemy character with swinging the sword in right and left direction or vertically by moving the first controller 34 in the right hand. In this way, it is not necessary to perform the operation such as separating the motion of each controller 34 and 36 one by one, and the game can be played while continuously moving each controller 34, 36.

In addition, since the motions in a plurality of directions are detected by using a multi-axial acceleration sensor, the direction corresponding to a maximum motion value can be specified as the moving direction of these controllers 34 and 36, by comparing the motion values in the plurality of directions in each controller 34, 36, and further by comparing the motion values with the motion values of other controllers 34 and 36, the direction of the maximum operation out of the plurality of controllers 34 and 36 can be determined.

Also, only the maximum motions of the first controller 34 operated by the right hand and the second controller 36 operated by the left hand of the player are made effective. Therefore, even if operating the controller by simultaneously moving both hands, the game is performed in accordance with the operation by one hand. Accordingly, in the game that is unnatural if both hands are simultaneously operated, unnaturalness can be prevented. In the aforementioned game such as fighting with sword and shield by the player character, a situation such as simultaneously executing the motion of cutting by sword and the motion of protruding the shield frontward can be prevented. Also, for example, in a boxing game, unnatural motion such as simultaneously punching by both hands can be prevented. Particularly, in the boxing game, etc., when the punch is dropped by one hand, in many cases, the other hand unconsciously performs the motion such as starting an approach run, and the acceleration is also detected from both of the controllers 34 and 36 in many cases. However, in this case also, by making only the maximum motion effective, only the motion of an actual punch can be made effective and can be reflected on the game.

Note that in the aforementioned exemplary embodiment, as the motion of the controllers 34 and 36, the acceleration variation of each axial direction is calculated and the magnitude of each variation is determined. However, in other exemplary embodiments, simply the magnitude of the acceleration value of each axial direction detected at a certain time may be determined.

In addition, in the aforementioned game system 10 of each exemplary embodiment, the game played by one player using two controllers 34 and 36 is executed. However, in another exemplary embodiment, a multi-player game may be executed, that is played by a plurality of players each using the controller 14. Note that the controller 14 used by each player may be only the first controller 34, or may be both of the first controller 34 and the second controller 36 in the same way as the aforementioned exemplary embodiment. In this exemplary embodiment also, the magnitude of the motion detected by the controller 14 of each player is determined and the motion of the controller 14 capable of detecting the motion of a maximum value is made effective and is processed. Accordingly, for example, it is possible to propose a new game competing on the speed such as who can swing the controller 14 fastest. In addition, by performing a correction to the motion value of the controller 14 of a particular player in accordance with a player selection or a level setting or the like, it is possible to provide a way of playing such as giving odds to the particular player.

Further, in the aforementioned each exemplary embodiment, the acceleration sensors 84 and 90 are used as an apparatus for detecting the motion value of the controllers 34 and 36. However, in other exemplary embodiments, instead of the acceleration sensors 84 and 90, a gyro sensor is provided in the controller, and the motion value of this controller may be detected. Note that as described above, the acceleration sensor is affected by the accelerated motion and the gravity acceleration, and detects per each axis the acceleration of a linear component in each sensing axial direction. However, even if the acceleration sensor is rotated around an axial center of this acceleration sensor, the acceleration for each axis cannot be detected, other than a gravitational acceleration. Meanwhile, differently from the acceleration sensor, the rotation (or angular speed) of the gyro sensor around a shaft defined by one or a plurality of gyroscope elements of the gyro sensor can be directly detected. However, the gyro sensor cannot detect a linear acceleration not involving rotation. Accordingly, because of the aforementioned difference between the acceleration sensor and the gyro sensor, the same function cannot be realized only by simply replacing the acceleration sensor with the gyro sensor. Therefore, in this exemplary embodiment, it is necessary to apply a proper processing to an output signal of the gyro sensor. For example, when an inclination of a posture from a certain state is calculated by the gyro sensor, first, the value of the inclination at the time point of starting detection by the gyro sensor is initialized. Then, the angular speed outputted from this gyro sensor from this time point is integrated. Further, by calculating the variation of the inclination from the value of the initialized inclination, an angle formed to the posture at the initialized time point can be obtained. Namely, a relative angle, with a certain time point set as a reference, can be obtained. The angle thus calculated is regarded as the motion of the controller, and by determining the size of this angle, the direction or the motion of the controller corresponding to the maximum angle can be specified as effective. Note that when the posture, with a gravitational direction set as a reference, of the device equipped with the gyro sensor is needed, this device needs to be initialized, with the gravitational direction set as a reference (such as a horizontally maintained state). Meanwhile, in a case of the device equipped with the acceleration sensor, there is a merit that initialization is not required because the acceleration sensor sets the gravitational direction as a reference.

Although certain exemplary embodiments have been described and illustrated in detail, it is clearly understood that the same is by way of illustration and example only and is not to be taken by way of limitation, the spirit and scope of these certain exemplary embodiments being limited only by the terms of the appended claims.

What is claimed is:

1. A non-transitory storage medium storing a game program executed in a computer of a game apparatus including a plurality of operation devices each having a motion detector for detecting motion, wherein
said game program makes said computer execute:
acquiring a motion value detected by each motion detector of each of the plurality of operation devices;
determining a magnitude of each acquired motion value for each of the plurality of operation devices; and
processing the motion value that is determined to have the maximum magnitude out of the motion values detected by each motion detector of each of the plurality of operation devices as the effective motion value.

2. A storage medium storing a game program according to claim 1, wherein
acquiring the motion value detected by each motion detector includes acquiring the motion value detected per unit time by each motion detector;
determining the magnitude of each acquired motion value includes respectively calculating a variation per unit time of each acquired motion value, and determines a magnitude of each variation as the motion value.

3. A storage medium storing a game program according to claim 1, wherein
said motion detector detects each of the motions in a plurality of directions;
acquiring the motion value detected by each motion detector includes acquiring the motion value in each of the plurality of directions;
determining the magnitude of each acquired motion value includes determining the magnitude of the motion value in each direction for each operation device and specifying a direction corresponding to a maximum motion value as a moving direction of the operation device, and determines the magnitude of the motion value of each operation device corresponding to the specified direction of each operation device.

4. A storage medium storing a game program according to claim 1, wherein determining the magnitude of each acquired motion value includes correcting at least one of the respective acquired motion values, and determines the magnitude of said respective motion values including a corrected motion value.

5. A storage medium storing a game program according to claim 1, wherein
said plurality of operation devices include a first operation device for being operated by a right hand of a player, and a second operation device for being operated by a left hand of said player.

6. A storage medium storing a game program according to claim 1, wherein said motion detector is an acceleration sensor.

7. A game apparatus including a plurality of operation devices each having a motion detector for detecting a motion, comprising:
a processor;
a memory coupled to said processor, said memory storing instructions that, when executed by said processor, control said processor to:
acquire a motion value detected by each motion detector of each of the plurality of operation devices;
determine a magnitude of each acquired motion value for each of the plurality of operation devices; and
process the motion value that is determined to have the maximum magnitude out of the motion values detected by each motion detector of each of the plurality of operation devices to be the effective motion value.

8. A game system including a plurality of operation devices each having a motion detector for detecting a motion, comprising:
a processor;
a memory coupled to said processor, said memory storing instructions that, when executed by said processor, control said processor to:
acquire a motion value detected by each motion detector of each of the plurality of operation devices;
determine a magnitude of each acquired motion value for each of the plurality of operation devices; and
process the motion value that is determined to have the maximum magnitude out of the motion values detected by each motion detector of each of the plurality of operation devices to be the effective motion value.

9. A method for detecting motion in a game apparatus having a plurality of operation devices each having a motion detector for detecting motion, comprising:
acquiring a motion value detected by each motion detector of each of the plurality of operation devices;
determining a magnitude of each acquired motion value for each of the plurality of operation devices; and
processing the motion value that is determined to have the maximum magnitude out of the motion values detected by each motion detector of each of the plurality of operation devices as the effective motion value.

* * * * *